(12) United States Patent
Yasui

(10) Patent No.: US 10,082,643 B2
(45) Date of Patent: Sep. 25, 2018

(54) OPTICAL SYSTEM AND OPTICAL APPARATUS WITH DIFFRACTIVE OPTICAL ELEMENT

(71) Applicant: CANON KABUSHIKI KAISHA, Tokyo (JP)

(72) Inventor: Hiroto Yasui, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 15/375,584

(22) Filed: Dec. 12, 2016

(65) Prior Publication Data
US 2017/0168269 A1    Jun. 15, 2017

(30) Foreign Application Priority Data

Dec. 15, 2015 (JP) ................. 2015-244639

(51) Int. Cl.
| | | |
|---|---|---|
| G02B 27/44 | (2006.01) | |
| G02B 13/00 | (2006.01) | |
| G02B 5/18 | (2006.01) | |
| G02B 7/02 | (2006.01) | |
| G02B 7/08 | (2006.01) | |
| G02B 9/14 | (2006.01) | |
| G02B 27/00 | (2006.01) | |
| G02B 27/42 | (2006.01) | |
| G02B 27/64 | (2006.01) | |

(52) U.S. Cl.
CPC ....... *G02B 13/0045* (2013.01); *G02B 5/1847* (2013.01); *G02B 5/1876* (2013.01); *G02B 7/021* (2013.01); *G02B 7/08* (2013.01); *G02B 9/14* (2013.01); *G02B 27/0025* (2013.01); *G02B 27/4205* (2013.01); *G02B 27/646* (2013.01)

(58) Field of Classification Search
CPC .............. G02B 27/0037; G02B 27/4205
USPC ................. 359/565, 569, 570, 576
See application file for complete search history.

(56) References Cited

U.S. PATENT DOCUMENTS

| | | |
|---|---|---|
| 7,253,973 B2 | 8/2007 | Yasui |
| 7,295,387 B1 * | 11/2007 | Ohmori ............ G02B 5/18 359/570 |
| 8,355,205 B2 | 1/2013 | Yasui |

FOREIGN PATENT DOCUMENTS

| | | |
|---|---|---|
| JP | 2007121440 A | 5/2007 |
| JP | 2011002555 A | 1/2011 |

* cited by examiner

*Primary Examiner* — Audrey Y Chang
(74) *Attorney, Agent, or Firm* — Rossi, Kimms & McDowell LLP

(57) ABSTRACT

An optical system includes a diffractive surface and at least one aspherical surface, an aspherical surface of at least one aspherical surface closest to the diffractive surface is referred to as a first aspherical surface, a phase function ψ(r) and an aspherical function X(r) of the first aspherical surface increase with different signs from each other in a height direction with increasing a distance from an optical axis, and a condition below is satisfied:

$$-0.10 \le \sum_{i=1}^{p}(Ci \times (f/Fno)^{2 \times i-1}) / \sum_{j=1}^{q}(Aj \times (f/Fno)^{2 \times j+1}) \le -0.01$$

where f is a focal length of the optical system when focusing on an infinite object, and Fno is an F number of the optical system.

8 Claims, 12 Drawing Sheets

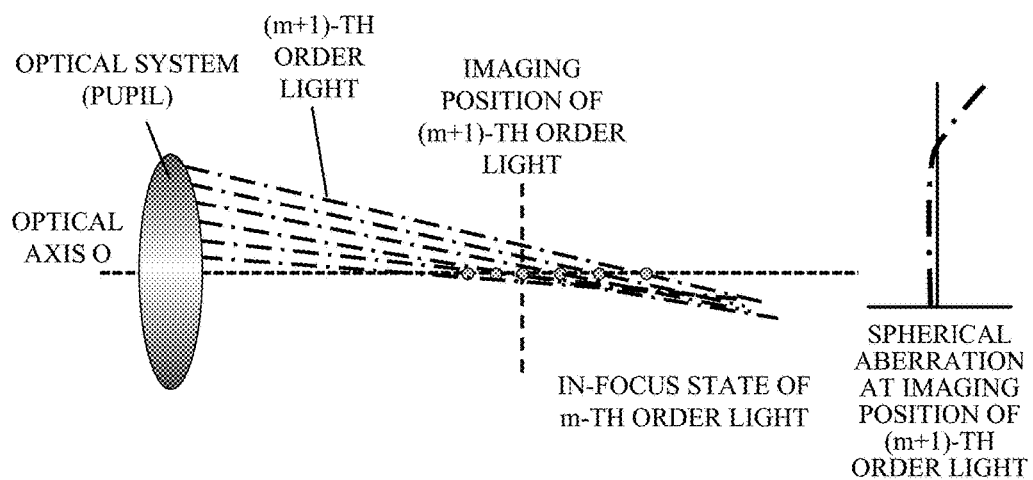
FIG. 8A
FIG. 8B
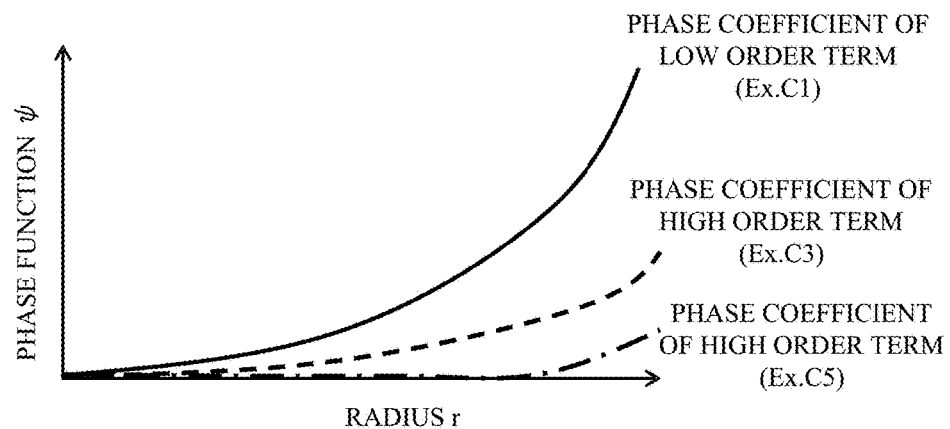
FIG. 8C

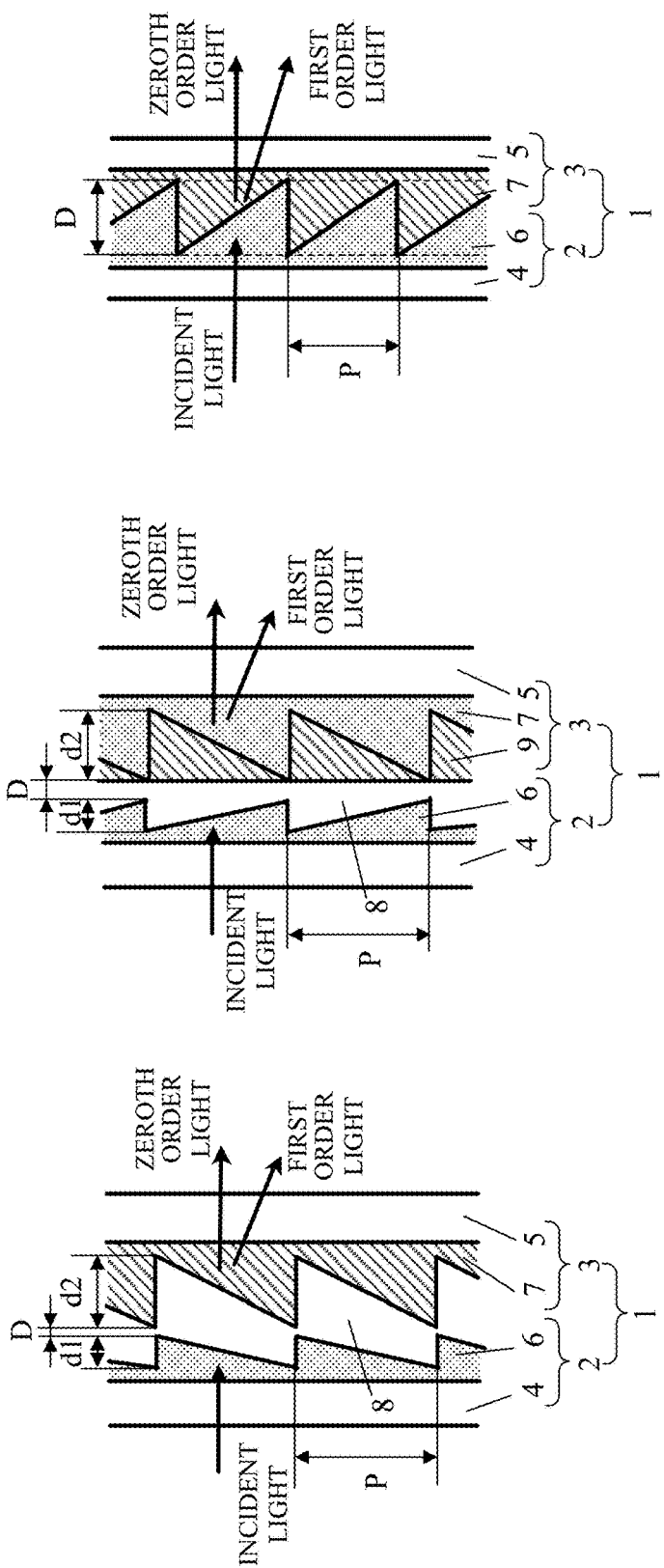

OPTICAL SYSTEM AND OPTICAL APPARATUS WITH DIFFRACTIVE OPTICAL ELEMENT

BACKGROUND OF THE INVENTION

Field of the Invention

The present invention relates to an optical system with a diffractive optical element, and more particularly relates to an imaging optical system that is used in an optical apparatus such as a still camera and a video camera.

Description of the Related Art

As a method of reducing (correcting) a longitudinal chromatic aberration or a chromatic aberration of magnification that occurs in an imaging optical system used for a typical camera, a method of using a diffractive optical element is known. This is a method of using a negative dispersion characteristic (νd=−3.453) or strong abnormal dispersion (θgF=0.296) of the diffractive optical element different from those of a common glass material to obtain a strong achromatic effect that cannot be obtained by a common optical glass material.

Although it is possible to correct a chromatic aberration that occurs in the imaging optical system by using the diffractive optical element, a flare that occurs by unnecessary diffracted light of orders other than a designed order reaching an image plane may increase if a refractive power on a diffractive surface of the diffractive optical element is too strong in order to emphasize an aberration correction. In the imaging optical system using the diffractive optical element, in order to suppress the generation of the flare, Japanese Patent Laid-open No. 2007-121440 and Japanese Patent Laid-open No. 2011-002555 disclose arranged location and configurational conditions of diffractive optical element. In Japanese Patent Laid-open No. 2007-121440, a glass material with an abnormal dispersion within a range of a specific material property is located at an appropriate position in a first lens unit disposed at the most object side, and accordingly a satisfactory aberration correction effect is obtained. In addition to that, the diffractive surface is arranged at the imaging plane side so as to have a configuration where external light other than the imaging light does not easily enter the diffractive surface directly, and accordingly the generation of the flare caused by the diffractive surface is suppressed. In Japanese Patent Laid-open No. 2011-002555, a diffractive optical unit including a plurality of laminated diffractive gratings and a refractive optical unit formed by a solid material contact closely with each other to constitute a diffractive optical element, and the solid material of the refractive optical unit has an abnormal dispersion property within a specific material property. Furthermore, a thickness of the refractive optical unit in an optical axis direction is set within an appropriate range. As a result, the aberration correction effect is enhanced, and a refractive power on the diffractive surface of the diffractive grating unit is relaxed to suppress the generation of the flare.

However, in any of Japanese Patent Laid-open No. 2007-121440 and Japanese Patent Laid-open No. 2011-002555, the refractive power on the diffractive surface of the diffractive optical element is considered, but they only consider a refractive power specified by phase coefficients of low order terms in a phase function. According to the study by the inventor, when considering the flare caused by the diffractive surface of the diffractive optical element, the refractive power specified by the phase coefficients of the low order terms is insufficient and a refractive power specified by phase coefficients of high order terms need to be considered.

SUMMARY OF THE INVENTION

The present invention provides an optical system and an optical apparatus using the optical system which has a flare suppression effect considering a refractive power specified by phase coefficients of high order light on a diffractive surface of a diffractive optical element and is capable of correcting various aberrations satisfactorily.

An optical system as one aspect of the present invention includes a diffractive surface and at least one aspherical surface, a phase function $\psi(r)$ of the diffractive surface is represented by $$\psi(r)=2\times m\times\pi/\lambda 0\times(C1\times r^2+C2\times r^4+C3\times r^6+C4\times r^8+C5\times r^{10}+\ldots+Cp\times r^{2\times p}),$$

where $\lambda 0$ is a designed wavelength, m (m is an integer) is a designed diffractive order, r is a position from an optical axis in a height direction orthogonal to the optical axis, i is an integer from 1 to p, Ci is a phase coefficient of a 2i-th order term, an aspherical function $X(r)$ of the aspherical surface is represented by $$X(r)=(1/R)\times r^2/[1+\sqrt{\{1-(1+k)(r/R)^2\}}]+A1\times r^4+A2\times r^6+A3\times r^8+A4\times r^{10}+\ldots+Aq\times r^{2\times(q+1)},$$

where R is a paraxial radius of curvature, k is a conic constant, r is the position from the optical axis in the height direction, j is an integer from 1 to q, Aj is an aspherical coefficient of a 2(j+1)-th order term, and when an aspherical surface of the at least one aspherical surface closest to the diffractive surface is referred to as a first aspherical surface, the phase function $\psi(r)$ and the aspherical function $X(r)$ of the first aspherical surface increase with different signs from each other in the height direction with increasing a distance from the optical axis, and a condition below is satisfied:

$$-0.10 \leq \sum_{i=1}^{p}(Ci\times(f/Fno)^{2\times i-1}) \bigg/ \sum_{j=1}^{q}(Aj\times(f/Fno)^{2\times j+1}) \leq -0.01$$

where f is a focal length of the optical system when focusing on an infinite object, and Fno is an F number of the optical system.

An optical apparatus as another aspect of the present invention includes the optical system and a housing holding the optical system.

Further features of the present invention will become apparent from the following description of exemplary embodiments with reference to the attached drawings.

BRIEF DESCRIPTION OF THE DRAWINGS

FIG. 8A is an explanatory diagram of the imaging state of the (m+1)-th diffracted light.

FIG. 8B is an explanatory diagram of the spherical aberration shape of the (m+1)-th diffracted light.

FIG. 8C is an explanatory diagram of a relationship between a phase function and a phase coefficient of the (m+1)-th diffracted light.

FIG. 10 is a diagram of illustrating a double-laminated diffractive optical element in an embodiment.

FIG. 11 is a diagram of illustrating a triple-laminated diffractive optical element in an embodiment.

FIG. 12 is a diagram of illustrating a contact double-layer diffractive optical element in an embodiment.

DESCRIPTION OF THE EMBODIMENTS

Exemplary embodiments of the present invention will be described below with reference to the accompanied drawings.

First, characteristics common to specific optical systems (imaging optical systems or image pickup optical systems) in Embodiments 1 to 3 described below will be described. The following two features are included as main characteristics of the imaging optical system in each embodiment. A first feature is relaxing a local refractive power at the periphery of a diffractive surface in order to suppress an occurrence of flare caused by the diffractive surface of a diffractive optical element. A second feature is reducing a high-order spherical aberration generated by the first feature to maintain a desired optical performance in an entire optical system. Hereinafter, the first and second features are described in detail.

With respect to the first feature, typically, the diffractive optical element is used in the imaging optical system, the refractive power increases (i.e., grating pitch of a diffractive grating decreases) with increasing a distance from the center of the diffractive surface to the periphery. This is because the degree of the curve of a ray increases at the periphery and accordingly an amount of a generated aberration increases, and as a result the refractive power that is required for an aberration correction increases. In other words, a main factor of the occurrence of the flare caused by the diffractive surface exists on the periphery of the diffractive surface, and the occurrence of the flare can be suppressed by relaxation of the local refractive power on the periphery. In order to relax the local refractive power on the periphery of the diffractive surface, a high-order spherical aberration at an imaging position of diffracted light with a diffractive order near m-th order where m (m is an integer) is a designed diffractive order, for example (m+1)-th order diffracted light, needs to be greatly generated at the imaging position side of the m-th order diffracted light.

Figure 7A:
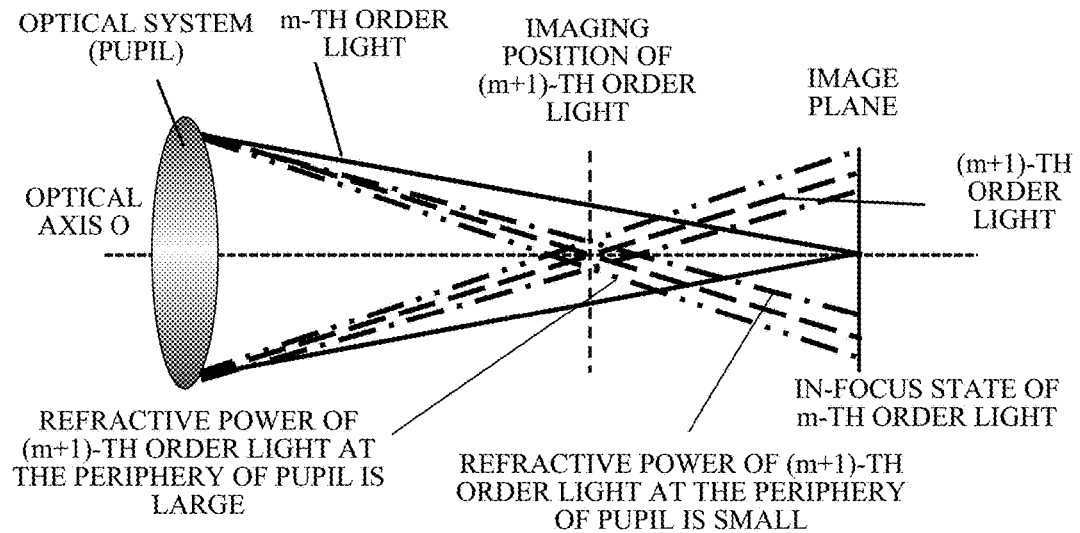
FIG. 7A is an explanatory diagram of an imaging state of an m-th order diffracted light and an (m+1)-th diffracted light.
Figure 7B:
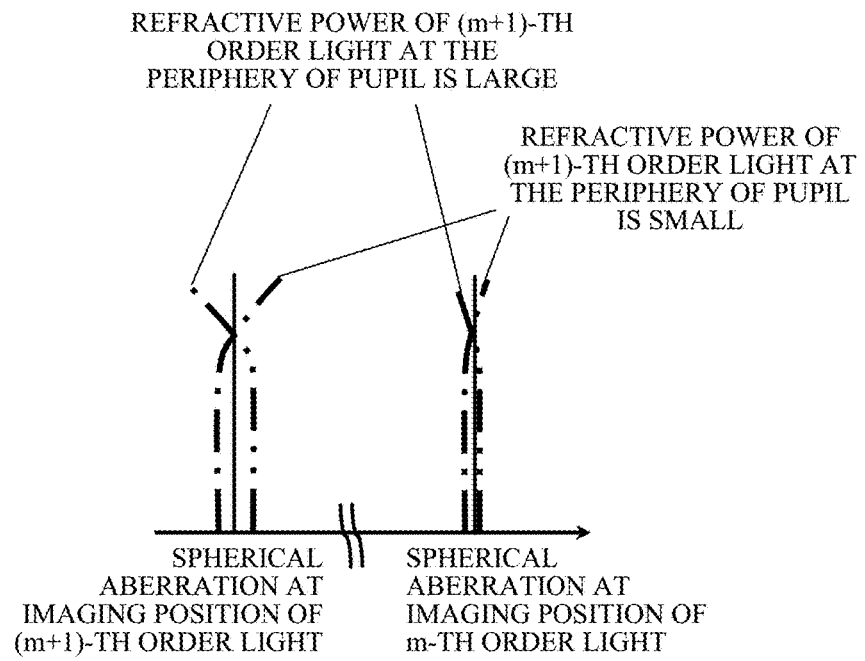
FIG. 7B is an explanatory diagram of spherical aberration shapes of the m-th order diffracted light and the (m+1)-th diffracted light.

This will be described referring to FIGS. 7A and 7B. In FIGS. 7A and 7B, it is assumed that a refractive power of the m-th order diffracted light (hereinafter, referred to as m-th order light, and the same is applied to diffracted lights with other diffractive orders) is positive, and they illustrate a case where the diffractive surface and a pupil of the optical system are located on the same position. This is true in FIG. 8 described below. FIG. 7A illustrates an imaging state of on-axis rays of the m-th order light and the (m+1)-th order light, and FIG. 7B illustrates spherical aberration shapes of the m-th order light and the (m+1)-th order light in the imaging state illustrated in FIG. 7A. In FIG. 7A, the ray of the m-th order light is indicated by a solid line, the ray of the (m+1)-th order light is indicated by a dashed line, the ray with a small refractive power of the pupil peripheral ray of the (m+1)-th order light is indicated by a dashed-dotted line, and the ray with a large refractive power of the pupil peripheral ray of the (m+1)-th order light is indicated by a dashed-two dotted line. Also in FIG. 7B, the spherical aberration shape of the ray with the small refractive power of the pupil peripheral ray of the (m+1)-th order light is indicated by a dashed-dotted line, and the spherical aberration shape of the ray with the large refractive power of the pupil peripheral ray of the (m+1)-th order light is indicated by a dashed-two dotted line.

As can be seen in FIGS. 7A and 7B, the pupil peripheral ray with the (m+1)-th order light, i.e., with decreasing the refractive power on the periphery of the diffractive surface, the imaging position of the pupil peripheral ray comes close to the imaging position of the m-th order light. In other words, the high-order spherical aberration of the (m+1)-th order light occurs at the imaging position side of the m-th order light.

Next, as a method of generating the high-order spherical aberration of the (m+1)-th order light at the imaging position side of the m-th order light, a phase coefficient of a high order term in a phase function that represents a phase shape on the diffractive surface is set to be higher within an appropriate range. This will be described referring to FIGS. 8A to 8C.

FIG. 8A illustrates a light focus state of an on-axis ray near the imaging position of the (m+1)-th order light, and FIG. 8B illustrates a spherical aberration shape of the (m+1)-th order light in the light focus state of FIG. 8A. FIG. 8C illustrates a relationship between the phase function and the phase coefficient, and a vertical axis indicates a phase function ψ that represents a phase shape with reference to a designed wavelength and a lateral axis indicates a radius r as a position of a height direction (hereinafter, referred to as a radial direction) that is orthogonal to the optical axis from the optical axis of the optical system on the diffractive surface.

As can be seen in FIGS. 8A and 8B, in order to form the spherical aberration shape of the (m+1)-th order light to be a desired shape, positions where the (m+1)-th order lights intersects with the optical axis needs to be discrete with a distance from the center of the pupil of the optical system to the periphery in the radial direction. Thus, only high-order spherical aberration can be generated without substantially generating a low-order spherical aberration. Furthermore, in order to generate only the high-order spherical aberration, as described above, the phase coefficient of the high order term in the phase function is set to be higher within the appropriate range. This reason will be described referring to FIG. 8C.

A designed wavelength as a wavelength of incident light on the diffractive surface (diffractive optical element) is denoted by $\lambda 0$, and a designed diffractive order light as a diffractive order of the diffracted light that is emitted from the diffractive surface to be used for imaging is denoted by m (m is an integer). In this case, a phase function $\psi(r)$ is represented by expression (a) below.

$$\psi(r)=2\times m\times\pi/\lambda 0\times(C1\times r^2+C2\times r^4+C3\times r^6+C4\times r^8+C5\times r^{10}+\ldots+Cp\times r^{2\times p}), \quad (a)$$

In expression (a), symbol r is a radius from the optical axis, symbol i is an integer from 1 to p, and symbol Ci is a 2i-th order term.

FIG. 8C illustrates an influence where each of the phase coefficients of a low order term to a high order term gives to the phase function. In FIG. 8C, an influence that a phase coefficient C1 of the low order term (second order term) gives is indicated by a solid line, an influence that a phase coefficient C3 of the high order term gives is indicated by a dashed line, and an influence that a phase coefficient C5 of another high-order term is indicated by a dashed-dotted line.

As can be seen in FIG. 8C, as the order of the term of the phase coefficient is higher, only a phase at the periphery in a radial direction can be changed by changing a coefficient value. Typically, a spherical aberration depends on a degree of change of the phase shape in the radial direction represented by the phase function, and accordingly the high-order spherical aberration can be controlled by adjusting the phase coefficient of the high order term of a correlation function.

The second feature is to take measures for the influence on the spherical aberration of the high order of the m-th order light caused by the occurrence of the spherical aberration of the high order of the (m+1)-th order light according to the first feature. In other words, an aspherical surface is provided near the diffractive surface (especially, it is desirable that it is the same optical surface as the optical surface provided with the diffractive surface), and an aspherical coefficient of the high order term of the aspherical function that represents an aspherical surface in an opposite direction to the phase function of the high order term is set. Accordingly, the aspherical aberration of the high order of the m-th order light can be canceled.

Figure 9A:
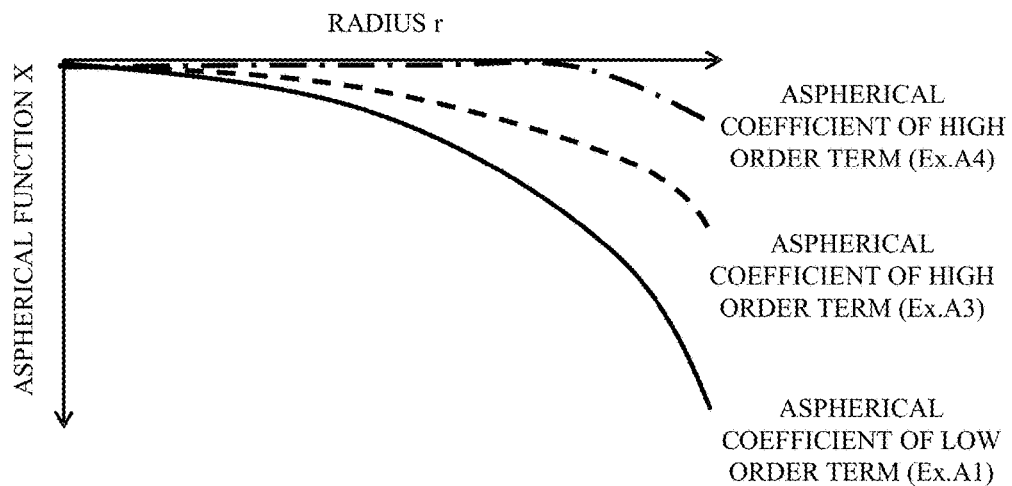
FIG. 9A is an explanatory diagram of a relationship between an aspherical function and aspherical coefficient.
Figure 9B:
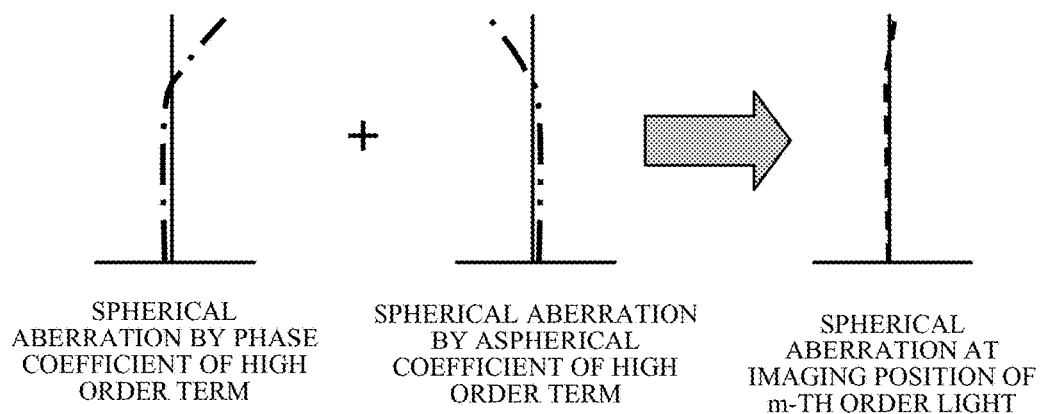
FIG. 9B is an explanatory diagram of a method of correcting a spherical aberration of the m-th order diffracted light.

This will be describe referring to FIGS. 9A and 9B. FIG. 9A illustrates a relationship between the aspherical function and the aspherical coefficient, and a vertical axis indicates an aspherical function (aspherical amount as an amount of separation from a paraxial spherical surface in the optical axis direction) X and a lateral axis indicates a radius r of the aspherical surface from the optical axis.

An aspherical function X(r) that represents an aspherical shape of the aspherical surface is represented by expression (b) below where symbol R is a paraxial radius of curvature, symbol k is a conic constant, symbol r is a radius, symbol j is an integer from 1 to q, and symbol Aj is an aspherical coefficient of 2(j+1)-th order term.

$$X(r)=(1/R)\times r^2/[1+\sqrt{\{1-(1+k)(r/R)^2\}}]+A1\times r^4+A2\times r^6+A3\times r^8+A4\times r^{10}+\ldots+Aq\times r^{2\times(q+1)} \quad (b)$$

FIG. 9A schematically illustrates the influence that each of aspherical coefficients from a low order term to a high order term gives to the aspherical function (aspherical amount). The influence given by an aspherical coefficient A1 of the low order term is indicated by a solid line, the influence given by an aspherical coefficient A3 of the high-order term is indicated by a dashed line, and the influence given by an aspherical coefficient A5 of the high order term is indicated by a dashed-dotted line.

As can be seen in FIG. 9A, as the order of the term of the aspherical coefficient is higher, only an aspherical amount at the periphery in the radial direction can be changed by changing this. This effect is opposite to the influence on the phase function by the phase coefficient illustrated in FIG. 8C. Typically, a spherical aberration depends on a degree of change of the aspherical amount in the radial direction represented by the aspherical function, and accordingly the spherical aberration can be controlled by adjusting the aspherical coefficient of the high order term.

FIG. 9B illustrates a method of correcting the spherical aberration of the high order of the m-th order light. As can be seen in FIG. 9B, the high-order spherical aberration occurring caused by the phase coefficient of the high order term on the diffractive surface is cancelled by the high-order spherical aberration occurring caused by the aspherical coefficient of the high order term on the aspherical surface, and accordingly a spherical aberration for an entire optical system is satisfactorily corrected.

Hereinafter, a condition that is to be satisfied to achieve the first and second features will be described below. An imaging optical system of each embodiment suppresses occurrence of a flare caused by a diffractive surface of a diffractive optical element, in particular, occurrence of a flare caused by a phase coefficient of a high order term, while the size of the weight of an entire optical system is reduced and various aberrations are satisfactorily corrected. In order to achieve this, it is necessary to appropriately set the relationship between the phase coefficient on the diffractive surface and the aspherical coefficient of the aspherical function on an aspherical surface. This relationship is prescribed in expression (1) below.

In the imaging optical system of each embodiment, (A) a single diffractive surface of the diffractive optical element is provided on optical surfaces in the imaging optical system. Or, (B) at least one aspherical surface is provided on at least one optical surface in the imaging optical system. In this case, it is desirable that the aspherical surface is disposed as close as possible to the diffractive surface in the optical axis direction. Furthermore, when the aspherical surface of the at least one aspherical surface closest to the diffractive surface is referred to as a first aspherical surface, an optical surface provided with the first aspherical surface may be identical to the optical surface provided with the diffractive surface.

The phase function $\psi(r)$ and the aspherical function X(r) of the aspherical surface provided on the optical surface closest to the diffractive surface increase with different signs from each other with increasing a distance from the optical axis of the imaging optical system in the redial direction. In other words, as one increases with a positive sign, the other increases with a negative sign.

Expression (1) below is satisfied:

$$-0.10 \leq \sum_{i=1}^{p}(Ci \times (f/Fno)^{2 \times i-1}) \Big/ \sum_{j=1}^{q}(Aj \times (f/Fno)^{2 \times j+1}) \leq -0.01, \quad (1)$$

where symbol f denotes a focal length of the imaging optical system when the phase coefficient Ci and the aspherical coefficient Aj of the aspherical surface provided on the optical surface closest to the diffractive surface are in a state of focusing on an infinite object, and symbol Fno denotes an F number of the imaging optical system. In expression (1), symbols i and j denote integers from 1 to p and q, respectively, as described above.

Prior to describing the condition of expression (1) above, the following two cases will be described. First, it is regarding each of the number of the diffractive surfaces and the number of the aspherical surfaces in the imaging optical system. The number of the diffractive surfaces is one in each embodiment because it is desirable that the number is small in view of the flare. The number of the aspherical surfaces is at least one as a minimum number required for correcting aberrations.

Second, it is regarding the standardization of the phase coefficient and the aspherical coefficient in the condition of expression (1). In expression (1), each of the phase coefficient and the aspherical coefficient is standardized into a dimensionless number by using the focal length f and the F number Fno. For example, standardizing the phase coefficient C1 results in C1×(f/Fno), and standardizing the phase coefficient C2 results in C2×(f/Fno)³. Continuing the standardization up to the p-th term results in Cp×(f/Fno)$^{2 \times p-1}$. On the other hand, standardizing the aspherical coefficient A1 results in A1×(f/Fno)³, and standardizing the aspherical coefficient A2 results in A2×(f/Fno)⁵. Continuing the standardization up to the q-th term results in Aq×(f/Fno)$^{2 \times q-1}$.

The condition represented by expression (1) specifies the relationship between a sum of the phase coefficients of the phase function and a sum of the aspherical coefficients of the aspherical function in the imaging optical system. The reason of obtaining each of the sums of the coefficients is to clarify the contribution to an entirety including signs of the coefficients, and it represents the contribution of the coefficient increases as the term of the coefficient is higher order. The range of expression (1) indicating a negative value means that the sum of the phase coefficients of the phase function and the sum of the aspherical coefficients of the aspherical function have different signs from each other. In other words, it means that values of the phase function and the aspherical function are generated in opposite directions to each other with respect to the diffractive surface and each optical surface provided with the first aspherical surface.

When the value of expression (1) exceeds the upper limit of the expression, it means that an absolute value of the sum of the phase coefficients as a numerator is too small or an absolute value of the sum of the aspherical coefficients as a denominator is too large. When the absolute value of the sum of the phase coefficients is too small, i.e., an absolute value of each of the phase coefficients of high order terms is too small, an amount of occurrence of the spherical aberration of the high order of the (m+1)-th light is insufficient. As a result, the relaxation effect of the refractive power at the periphery of the diffractive surface in the radial direction decreases and the flare caused by the diffractive surface increases, and accordingly it is not preferable. When the absolute value of the sum of the aspherical coefficients is too large, i.e., an absolute value of the aspherical coefficient of each of the aspherical coefficients of high order terms is too large, the amount of occurrence of the spherical aberration of the high order caused by the aspherical coefficient increases and an amount of occurrence of the spherical aberration of the high order in an entire optical system is too large, and accordingly it is not preferable.

On the other hand, when the value of expression (1) exceeds the lower limit of the expression, it means that the absolute value of the sum of the phase coefficients is too large or the absolute value of the sum of the aspherical coefficients is too small. When the absolute value of the sum of the phase coefficients is too large, i.e., the absolute value of each of phase coefficients of high order terms is too large, an amount of occurrence of the spherical aberration of the high order of the (m+1)-th order light caused by the phase coefficient is also too large. As a result, an amount of occurrence of the aspherical aberration of the high order of the m-th order light in the entire optical system is too large, and accordingly it is not preferable. When the absolute value of the sum of the aspherical coefficients, i.e., the absolute value of each of aspherical coefficients of high order terms is too small, the amount of occurrence of the spherical aberration of the high order caused by the aspherical coefficient is too small. As a result, the spherical aberration of the high order that occurs caused by the phase coefficient cannot be sufficiently cancelled by the spherical aberration of the high order caused by the aspherical coefficient and the amount of occurrence of the spherical aberration of the high order in the entire optical system is too large, and accordingly it is not preferable.

Preferably, instead of the condition represented by expression (1), a condition represented by expression (1a) below is satisfied. By satisfying the condition represented by expression (1a), the generation of the flare caused by the diffractive surface of the diffractive optical element, especially the flare caused by the phase coefficients of high orders, is suppressed, and various aberrations of the entire optical system can be satisfactorily corrected.

$$-0.090 \leq \sum_{i=1}^{p}(Ci \times (f/Fno)^{2 \times i-1}) \Big/ \sum_{j=1}^{q}(Aj \times (f/Fno)^{2 \times j+1}) \leq -0.015 \quad (1a)$$

More preferably, instead of the condition represented by expression (1a), a condition represented by expression (1b) is satisfied.

$$-0.07 \leq \sum_{i=1}^{p}(Ci \times (f/Fno)^{2 \times i-1}) \Big/ \sum_{j=1}^{q}(Aj \times (f/Fno)^{2 \times j+1}) \leq -0.02 \quad (1b)$$

It is desirable that conditions represented by expressions (2) and (3) below are satisfied in addition to satisfying the condition represented by expression (1) (or expression (1a) or (1b)) in view of reduction of a flare caused by the diffractive surface, especially a whole of the flare caused by the phase coefficients of low order terms to high order terms.

In other words, it is desirable that the conditions represented by expressions (2) and (3) are satisfied:

$$-1.0\times10^{-3} \le C1 \Big/ \sum_{i=2}^{p}(Ci\times(f/Fno)^{2\times i}) \le -1.0\times10^{-5} \quad (2)$$

$$0.001 \le (f/fdo)/(L/f) \le 0.100 \quad (3)$$

where a value of the sum of the phase coefficients of higher order terms is large compared to a value of the sum of the phase coefficients of lower order terms in the phase function $\psi(r)$, the focal length fdo on the diffractive surface is set to a value satisfying $1/fdo=-2\times m\times C1\times\lambda/\lambda 0$ for the wavelength $\lambda$, and symbol L denotes a total optical length of the imaging optical system.

The condition represented by expression (2) specifies a relationship between a phase coefficient C1 of the low order light (second order term) of the phase function and a sum of phase coefficients Ci of higher order terms than the phase coefficient C1. Each phase coefficient is standardized similarly to expression (1). The condition represented by expression (3) specifies a relationship between a tele ratio (=total optical length/focal length of an entire system) of the imaging optical system and a focal length on the diffractive surface represented by the phase coefficient C1 of the second order term.

When a range of expression (2) is negative, it means that signs of the phase coefficient C1 of the second order term and the sum of the phase coefficients Ci of higher order terms than the phase coefficient C1 are different from each other, i.e., a direction of the generation of the phase function is opposite between the second order term and the higher order term than the second order term. When the sum of the phase coefficients Ci of higher order terms than the second order term is large compared to the phase coefficient C1 of the second order term, it means that the ratio of change of the phase increases as approaching the periphery of the diffractive surface in the radial direction in the phase function.

When a value of expression (2) exceeds the upper limit of expression, it means that the absolute value of the sum of the phase coefficients Ci of higher order terms as denominator is too large. When the absolute value of the sum of the phase coefficients of higher order terms is too large, i.e., the absolute value of each of phase coefficients of high order terms is too large, an amount of occurrence of the spherical aberration of the high order of the (m+1)-th order light is also too large. As a result, an amount of occurrence of the spherical aberration of the high order of the m-th order light in an entire optical system is too large, and accordingly it is not preferable.

On the other hand, when the value of expression (2) exceeds the lower limit of the expression, it means that the absolute value of the sum of the phase coefficients of high order terms is too small. When the absolute value of the sum of the phase coefficients of high order terms is too small, i.e., the absolute value of each of phase coefficients of high order terms is too small, an amount of occurrence of the spherical aberration of the high order of the (m+1)-th order light is insufficient. As a result, a relaxation effect of the refractive power at the periphery of the diffractive surface in the radial direction decreases and the flare caused by the diffractive surface increases, and accordingly it is not preferable.

Satisfying the condition represented by expression (3) means that a refractive power (=1/focal length) represented as the phase coefficient C1 of the second order term on the diffractive surface is weak and the generation of the flare caused by the diffractive surface is suppressed. When a value of expression (3) exceeds the upper limit of the expression, the refractive power represented by the phase coefficient C1 of the second order term on the diffractive surface is too strong and a pitch of the diffractive grating is fine, and a flare caused by diffracted light of orders other than the designed order m occurs, and accordingly it is not preferable. On the other hand, when the value of expression (3) exceeds the lower limit of the expression, the refractive power represented by the phase coefficient C1 of the second order term on the diffractive surface is too weak and it is difficult to correct a longitudinal chromatic aberration and a chromatic aberration of magnification, and accordingly it is not preferable.

Preferably, instead of the conditions of expressions (2) and (3), conditions represented by expressions (2a) and (3a) are satisfied.

$$-9.0\times10^{-4} \le C1 \Big/ \sum_{i=2}^{p}(Ci\times(f/Fno)^{2\times i}) \le -2.5\times10^{-5} \quad (2a)$$

$$0.005 \le (f/fdo)/(L/f) \le 0.090 \quad (3a)$$

More preferably, instead of the conditions represented by expressions (2a) and (3a), conditions represented by expressions (2b) and (3b) are satisfied.

$$-7.0\times10^{-4} \le C1 \Big/ \sum_{i=2}^{p}(Ci\times(f/Fno)^{2\times i}) \le -5.0\times10^{-5} \quad (2b)$$

$$0.010 \le (f/fdo)/(L/f) \le 0.080 \quad (3b)$$

It is desirable that a condition represented by expression (4) below is satisfied in addition to satisfying the condition represented by expression (1) (or expression (1a) or (1b)) and the conditions represented by expressions (2) and (3) (or expressions (2a) and (3a), or (2b) and (3b)). By satisfying the condition represented by expression (4), various aberrations of an entire imaging optical system, especially the spherical aberration of high orders, can be satisfactorily corrected.

As described above, the first aspherical surface of the at least one aspherical surface may be provided on the optical surface provided with the diffractive surface (i.e., the optical surface provided with the first aspherical surface may be the same as the optical surface provided with the diffractive surface), and it is more preferable. In this case, it is preferred that the sum of aspherical coefficients Aj of higher order terms than fourth order term is large compared to the aspherical coefficient A1 of the low order term (fourth order term) in the aspherical function X(r) on the first aspherical surface and that a condition represented by expression (4) below is satisfied.

$$-5.0\times10^{-3} \le A1 \Big/ \sum_{j=2}^{q}(Aj\times(f/Fno)^{2\times j}) \le 1.5\times10^{-5} \quad (4)$$

The condition represented by expression (4) specifies a relationship between the aspherical coefficient A1 of the fourth order term of the aspherical function for the imaging optical system and the sum of the aspherical coefficients Aj (j is an integer not less than 2) of higher order terms than the aspherical coefficient A1. Each aspherical coefficient is standardized similarly to expression (1). The reason why the first aspherical surface is preferably provided on the optical surface provided with the diffractive surface is that the spherical aberration of the high order that occurs caused by the phase coefficient of the high order term on the diffractive surface can be efficiently corrected. The sum of the aspherical coefficients Aj of higher order terms than the fourth order term is larger than the aspherical coefficient A1 of the fourth order term, and it indicates that an aspherical amount in the aspherical function increases as approaching the periphery of the aspherical surface in the radial direction.

When a value of expression (4) exceeds the upper limit of the expression, it means that the absolute value of the sum of the aspherical coefficients Aj of higher order terms as denominator is too large. When the absolute value of the sum of the aspherical coefficients of higher order terms is too large, an amount of occurrence of the spherical aberration of the high order caused by the aspherical coefficient is too large and an amount of occurrence of the spherical aberration of the high order in an entire optical system is too large, and accordingly it is not preferable.

On the other hand, when the value of expression (4) exceeds the lower limit of the expression, it means that the absolute value of the sum of the aspherical coefficients Aj of high order terms is too small. When the absolute value of the sum of the aspherical coefficients of high order terms is too small, an amount of occurrence of the spherical aberration of the high order caused by the aspherical coefficients is too small, and the spherical aberration of the high order that occurs caused by the phase coefficient cannot be sufficiently cancelled. As a result, the amount of occurrence of the spherical aberration of the high order in the entire optical system is too large, and accordingly it is not preferable.

Preferably, instead of the condition represented by expression (4), a condition represented by expression (4a) below is satisfied. By satisfying the condition represented by expression (4a), various aberrations of the imaging optical system, especially the spherical aberration of high orders, can be satisfactorily corrected, and further a size and a weight of the entire optical system can be reduced.

$$-4.00 \times 10^{-3} \leq A1 \Big/ \sum_{j=2}^{q} (Aj \times (f/Fno)^{2 \times j}) \leq 1.25 \times 10^{-5} \quad (4a)$$

More preferably, instead of the condition represented by expression (4a), a condition represented by expression (4b) below is satisfied.

$$-2.0 \times 10^{-3} \leq A1 \Big/ \sum_{j=2}^{q} (Aj \times (f/Fno)^{2 \times j}) \leq 1.0 \times 10^{-5} \quad (4b)$$

Finally, it is desirable that a condition represented by expression (5) below is satisfied in addition to satisfying the condition represented by expression (1) (or expression (1a) or (1b)), the conditions represented by expressions (2) and (3) (or expressions (2a) and (3a), or (2b) and (3b)), and the condition represented by expression (4) (or expression (4a) or (4b)). By satisfying the condition represented by expression (5), the generation of the flare caused by the diffractive surface, especially the flare caused by the phase coefficients of high order terms can be suppressed.

In the imaging optical system, the spherical aberration at the imaging position of the (m+1)-th order light occurs at the imaging position side of the m-th order diffracted light at the periphery of a pupil of the imaging optical system, and a condition represented by expression (5) is satisfied.

In expression (5), symbol $SAh9_{(m+1)}$ denotes a spherical aberration amount in a state of focusing on the infinite object at a 90% position of the pupil for d-line of the (m+1)-th order diffracted light (hereinafter, referred to as an infinite in-focus state). Similarly, symbol $SAh5_{(m+1)}$ denotes a spherical aberration amount in the infinite in-focus state at a 50% position of the pupil for the d-line of the (m+1)-th order light.

$$2 < SAh9_{(m+1)}/SAh5_{(m+1)} < 40 \quad (5)$$

The condition represented by expression (5) specifies a spherical aberration shape for d-line at the imaging position of the (m+1)-th order light in the optical system, and the contents described referring to FIGS. 8A and 8B are conditioned by the expression. The condition represented by expression (5) indicates that the spherical aberration for the d-line at the imaging position of the (m+1)-th order light is constant and it does not substantially occur from a center of a pupil to a middle of the pupil of the optical system, while it greatly occurs at the periphery of the pupil and it occurs at the imaging position side of the m-th order light. As described referring to FIGS. 8A and 8B, it means that the refractive power on the diffractive surface at the periphery in the radial direction decreases and the generation of the flare caused by the diffractive surface is suppressed.

When a value of expression (5) exceeds the upper limit of the expression, the spherical aberration of the d-line at the imaging position of the (m+1)-th order light is too large at the imaging position side of the m-th order light and also an amount of occurrence of the spherical aberration of the high order of the m-th order light for the entire optical system is too large, and accordingly it is not preferable. On the other hand, when the value of expression (5) exceeds the lower limit of the expression, with respect to the spherical aberration of the d-line at the imaging position of the (m+1)-th order light, an amount of occurrence at the imaging position side of the m-th order light is too small. As a result, a relaxation effect of the refractive power on the diffractive surface at the periphery in the radial direction decreases and the flare caused by the diffractive surface increases, and accordingly it is not preferable.

Preferably, instead of the condition represented by expression (5), a condition represented by expression (5a) below is satisfied. By satisfying the condition represented by expression (5a), the generation of the flare caused by the diffractive surface, especially the flare caused by the phase coefficients of high order terms, can be effectively suppressed.

$$2.5 < SAh9_{(m+1)}/SAh5_{(m+1)} < 35.0 \quad (5a)$$

More preferably, instead of the condition represented by expression (5a), a condition represented by expression (5b) below is satisfied.

$$3 < SAh9_{(m+1)}/SAh5_{(m+1)} < 32 \quad (5b)$$

Next, Embodiments 1 to 3 will be specifically described. First, symbols and the like that are common to each embodiment will be described. An imaging optical system of each embodiment is a single focus ultratelephoto lens, and it is used as an imaging optical system of an imaging optical apparatus (image pickup apparatus or interchangeable lens) such as a still camera and a video camera. However, the optical system of each embodiment is not limited to the imaging optical system, and it can be used as an observation optical system of an observation optical system such as a telescope, a projection optical system of an image projection optical apparatus (image projection apparatus), or the like. The optical apparatus includes the optical system and a housing (lens barrel or lens holder) holding the optical system.

Figure 1A:
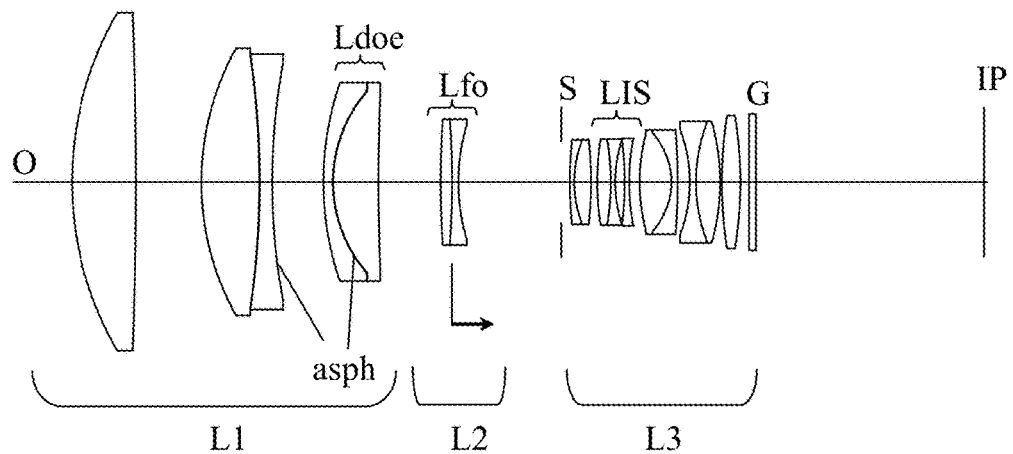
FIG. 1A is a cross-sectional view of illustrating a configuration of an imaging optical system in Embodiment 1 of the present invention.
Figure 1B:
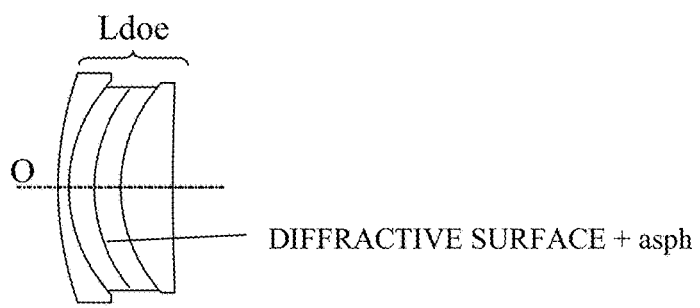
FIG. 1B is a cross-sectional view of illustrating a configuration of a diffractive optical element in Embodiment 1 of the present invention.
Figure 3A:
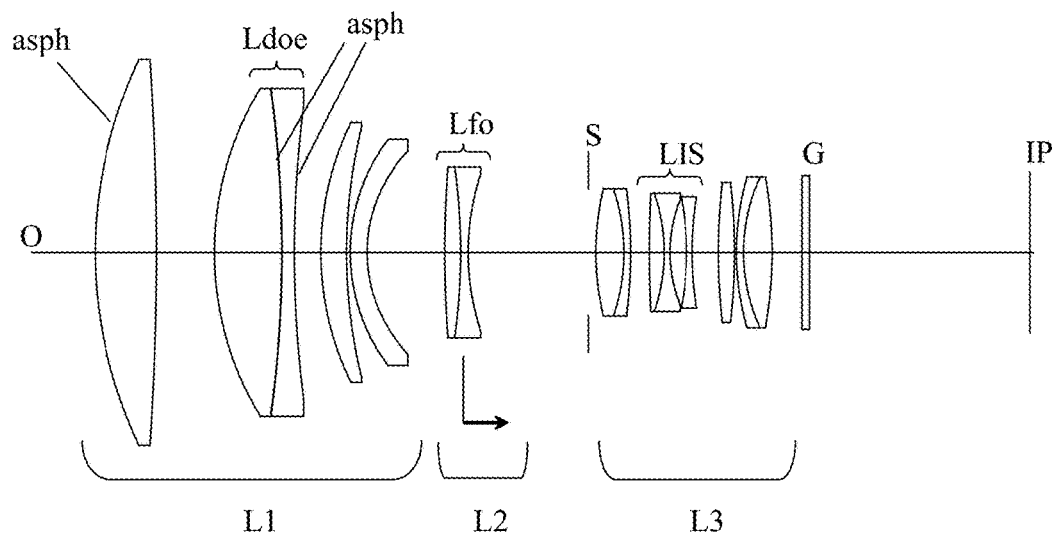
FIG. 3A is a cross-sectional view of illustrating a configuration of an imaging optical system in Embodiment 2 of the present invention.
Figure 3B:
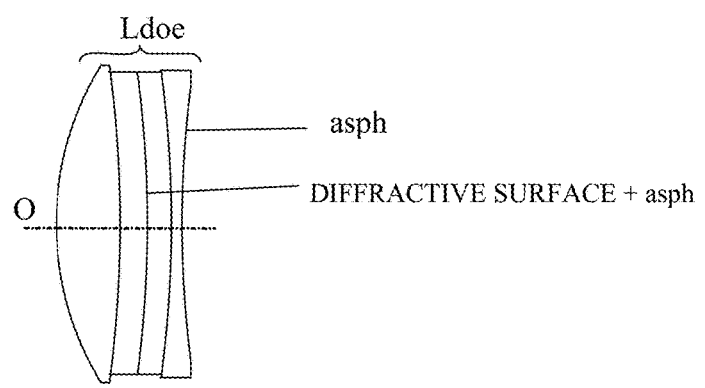
FIG. 3B is a cross-sectional view of illustrating a configuration of a diffractive optical element in Embodiment 2 of the present invention.
Figure 5A:
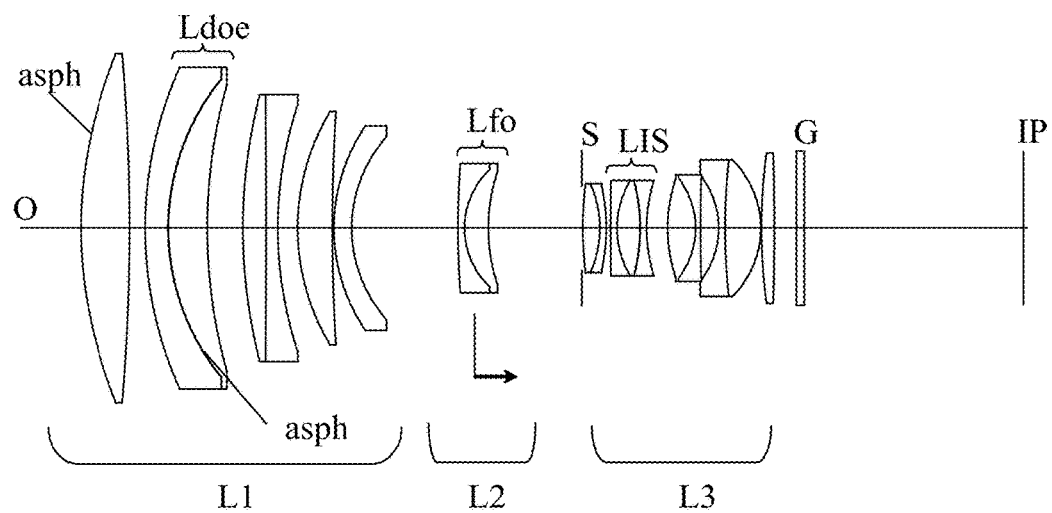
FIG. 5A is a cross-sectional view of illustrating a configuration of an imaging optical system in Embodiment 3 of the present invention.
Figure 5B:
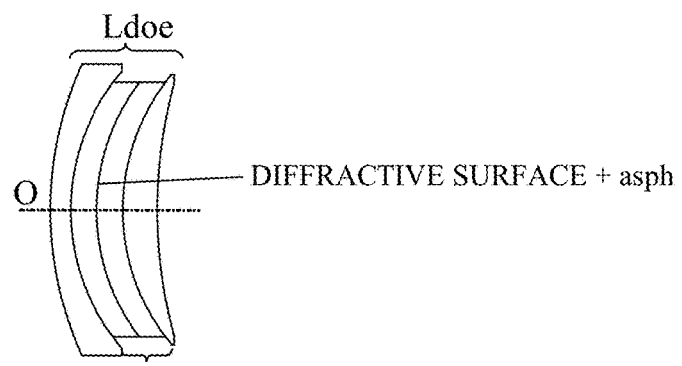
FIG. 5B is a cross-sectional view of illustrating a configuration of a diffractive optical element in Embodiment 3 of the present invention.

FIGS. 1A, 3A, and 5A respectively illustrate configurations of the imaging optical systems in Embodiments 1 to 3 in the infinite in-focus state. FIGS. 1B, 3B, and 5B illustrate configurations of diffractive optical elements provided in the respective imaging optical system. While a diffractive surface is illustrated as a curved surface in each drawing, in reality, a plurality of diffractive gratings are arranged in laminae along the curved surface.

Each of the imaging optical systems illustrated in FIGS. 1A, 3A, and 5A includes a first lens unit L1 having a positive refractive power, a second lens unit L2 having a negative refractive power, an aperture stop S, and a third lens unit L3 having a positive refractive power that are arranged in order from an object side to an image side. In each drawing, symbol Ldoe denotes a diffractive optical element, symbol asph denotes an aspherical surface. Symbol O denotes an optical axis, and symbol IP denotes an image plane. Symbol G denotes a glass block such as a quartz low-pass filter and an infrared cut filter.

A diffractive surface of the diffractive optical element Ldoe is provided on a joint surface of a cemented lens constituting the diffractive optical element Ldoe. A change of focus from an infinite object side to a close-range object side is achieved by moving a focus lens unit Lfo of the second lens unit L2 toward the image side. An IS lens unit LIS of the third lens unit L3 moves (shifts) in a direction orthogonal to the optical axis O to reduce image blur caused by a hand shake or the like.

Figure 2:
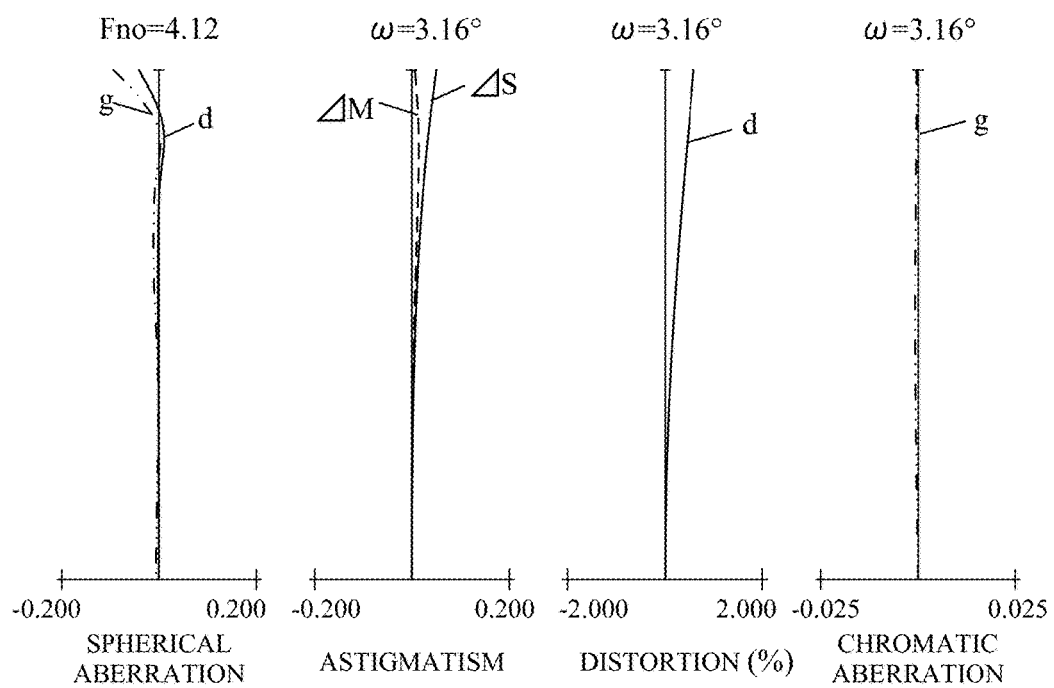
FIG. 2 is a diagram of illustrating various aberrations of the imaging optical system in an infinite in-focus state in Embodiment 1.
Figure 4:
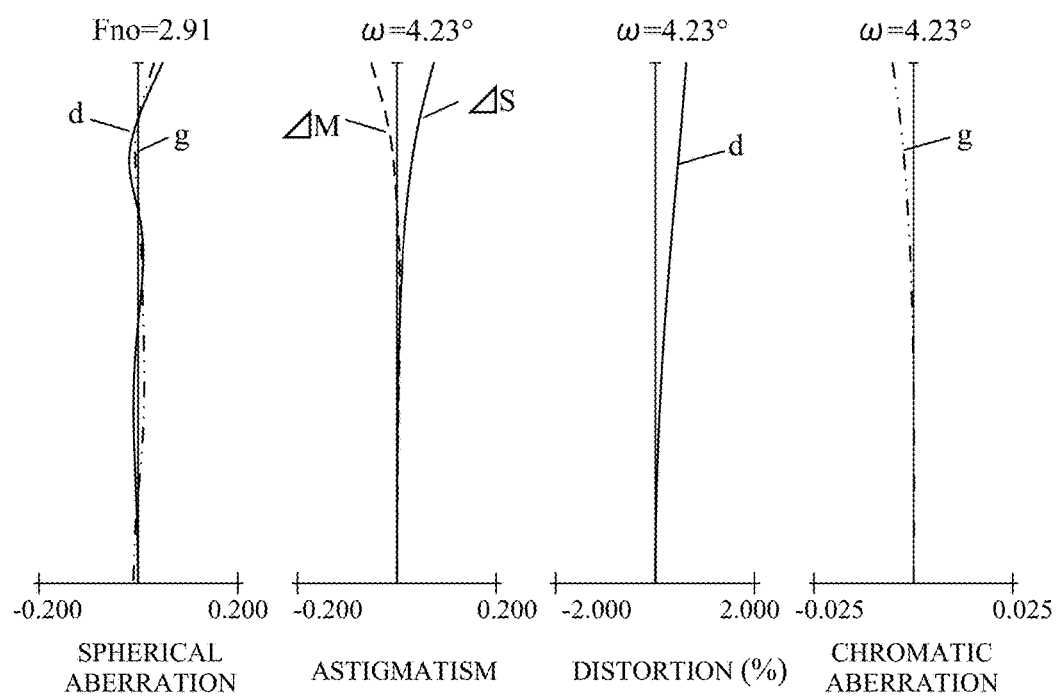
FIG. 4 is a diagram of illustrating various aberrations of the imaging optical system in an infinite in-focus state in Embodiment 2.
Figure 6:
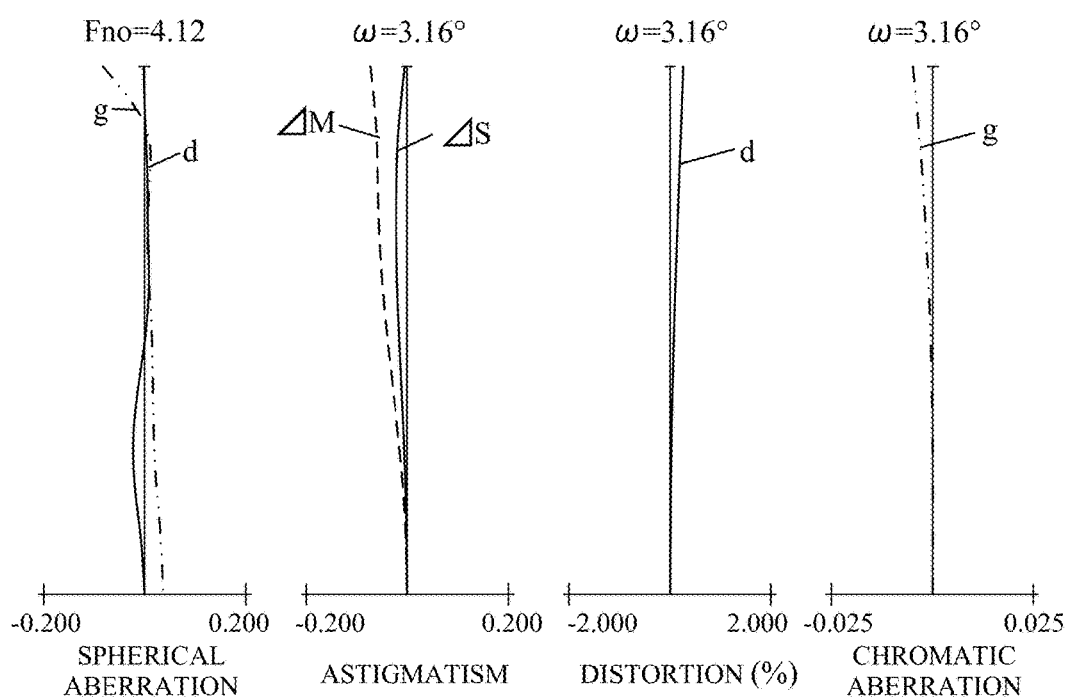
FIG. 6 is a diagram of illustrating various aberrations of the imaging optical system in an infinite in-focus state in Embodiment 3.

FIGS. 2, 4, and 6 respectively illustrate various aberrations (spherical aberration, astigmatism, distortion, and chromatic aberration of magnification) of imaging optical systems illustrated in FIGS. 1A, 3A, and 5A in the infinite in-focus state. With respect to the spherical aberration in each of FIGS. 2, 4, and 6, a solid line indicates a spherical aberration for d-line, and a dashed-two dotted line indicates a spherical aberration for g-line. With respect to the astigmatism, a solid line indicates astigmatism of a sagittal ray (ΔS) for d-line, and a dashed line indicates astigmatism of a meridional ray (ΔM) for d-line. The distortion is indicated for d-line. The chromatic aberration of magnification is indicated as a dashed-two dotted line for g-line with reference to d-line. In each drawing, symbol Fno denotes an F number, and symbol ω denotes a half angle of view.

Embodiment 1

An imaging optical system of Embodiment 1 illustrated in FIG. 1A is an ultratelephoto lens having a focal length of 392.2 mm and an Fno is 4.12. A diffractive optical element Ldoe is a fourth cemented lens which is disposed from the object side in a first lens unit L1.

The diffractive optical element Ldoe is enlarged to be illustrated in FIG. 1B. The diffractive surface is provided on a cemented surface of the cemented lens that constitutes the diffractive optical element Ldoe, and an aspherical surface (first aspherical surface) asph is provided on the same cemented surface. Thus, as described above with respect to the condition of expression (4), the spherical aberration of the high order that is caused by a phase coefficient of a high order term on the diffractive surface can be efficiently corrected.

As illustrated in FIG. 1A, in the first lens unit L1, another aspherical surface asph is provided on an image-side lens surface of a third negative lens from the object side. The reason why the aspherical surface is provided on the lens surface is that the imaging optical system of this embodiment is shortened in a total optical length and that a basic aberration such as a spherical aberration and a coma aberration generated described above needs to be corrected. Since it is desirable that the ray widely and evenly passes through the optical surface provided with the aspherical surface, the third negative lens from the object side is set to be an image-side lens surface.

As can be seen in the aberration diagram of FIG. 2, in the imaging optical system of this embodiment, various aberrations are satisfactorily corrected in an infinite in-focus state.

Then, this embodiment (numerical example 1 described below) satisfies all conditions described above as illustrated in Table 1 collectively, and it achieves a small and light imaging optical system where the various aberrations have been satisfactorily corrected while suppressing the occurrence of the flare caused by the refractive power on the diffractive surface. In Table 1, E-M means $\times 10^{-M}$.

Embodiment 2

An imaging optical system of Embodiment 2 illustrated in FIG. 3A is an ultratelephoto lens having a focal length of 292.2 mm and an Fno is 2.91. A diffractive optical element Ldoe is a second cemented lens which is disposed from the object side.

The diffractive optical element Ldoe is enlarged to be illustrated in FIG. 3B. The diffractive surface is provided on a cemented surface of the cemented lens that constitutes the diffractive optical element Ldoe, and an aspherical surface (first aspherical surface) asph is provided on the same cemented surface. Thus, similarly to Embodiment 1, the spherical aberration of the high order that is caused by a phase coefficient of a high order term on the diffractive surface can be efficiently corrected.

In this embodiment, further two aspherical surfaces asph are provided. One aspherical surface is, as illustrated in FIG. 3B (and FIG. 3A), provided on the image-side lens surface of the cemented lens of the diffractive optical element Ldoe. This aspherical surface has a role of assisting the closest aspherical surface provided on an optical surface which is the same as the diffractive surface. Another aspherical surface is, as illustrated in FIG. 3A, provided on an object-side lens surface of a positive lens located closest to the object side in the first lens unit L1. The reason why this aspherical surface is provided, similarly to Embodiment 1, is that a basic aberration such as a spherical aberration and a coma aberration caused by shortening the total optical length is to be corrected.

As can be seen in the aberration diagram of FIG. 4, in the imaging optical system of this embodiment, various aberrations are satisfactorily corrected in an infinite in-focus state.

Then, this embodiment (numerical example 2 described below) satisfies all conditions described above as illustrated in Table 1 collectively, and it achieves a small and light imaging optical system where the various aberrations have been satisfactorily corrected while suppressing the occurrence of the flare caused by the refractive power on the diffractive surface.

Embodiment 3

An imaging optical system of Embodiment 3 illustrated in FIG. 5A is an ultratelephoto lens having a focal length of 392.1 mm and an Fno is 4.12. A diffractive optical element Ldoe is a second cemented lens which is disposed from the object side in the first lens unit L1.

The diffractive optical element Ldoe is enlarged to be illustrated in FIG. 5B. Also in this embodiment, the diffractive surface is provided on a cemented surface of the cemented lens that constitutes the diffractive optical element Ldoe, and an aspherical surface (first aspherical surface) asph is provided on the same cemented surface. Thus, similarly to Embodiments 1 and 2, the spherical aberration of the high order that is caused by a phase coefficient of a high order term on the diffractive surface can be efficiently corrected.

As illustrated in FIG. 5A, another aspherical surface asph is provided on the image-side lens surface of the positive lens located closest to the object side in the first lens unit L1, similarly to Embodiment 2. The reason is, similarly to Embodiments 1 and 2, to correct a basic aberration such as a spherical aberration and a coma aberration caused by shortening the total optical length.

As can be seen in the aberration diagram of FIG. 6, in the imaging optical system of this embodiment, various aberrations are satisfactorily corrected in an infinite in-focus state.

Then, this embodiment (numerical example 3 described below) satisfies all conditions described above as illustrated in Table 1 collectively, and it achieves a small and light imaging optical system where the various aberrations have been appropriately corrected while suppressing the occurrence of the flare caused by the refractive power on the diffractive surface.

Even when the optical configuration is different from any one of Embodiments 1 to 3, imaging optical systems that satisfy each condition described above are included in other embodiments of the present invention.

Next, a configuration of the diffractive optical element used in each embodiment will be described. As a configuration of the diffractive optical element, for example, a double-laminated configuration as illustrated in FIG. 10 or a triple-laminated configuration sandwiching an air layer as illustrated in FIG. 11 can be used. Alternatively, a contact double-layer configuration where two layers having the same grating thickness contact each other as illustrated in FIG. 12 may be used. As a method of manufacturing these diffractive optical elements, there is a method of forming a binary optics shape on a lens surface directly by using photoresist. Alternatively, a method of replica forming or molding where a mold that is manufactured by the above method may be used. Furthermore, a serrated kinoform can increase a diffraction efficiency, and the diffraction efficiency indicating a substantially ideal value can be expected.

In FIG. 10, a first diffractive grating 6 formed by an ultraviolet curable resin on a glass plate 4 and a second diffractive grating 7 formed by an ultraviolet curable resin, different from the first diffractive grating 6, on another glass plate 5 are disposed close to each other via an air layer 8 with a distance D. The combination of the first and second diffractive gratings 6 and 7 acts as a single diffractive optical element.

The grating thickness of the first diffractive grating 6 is d1, and the grating thickness of the second diffractive grating 7 is d2. With respect to shapes (direction) of the gratings, the first diffractive grating 6 has a shape where the grating thickness monotonically decreases from top to bottom in the drawing, and the second diffractive grating 7 has a shape where the grating thickness monotonically increases from top to bottom. As illustrated in the drawing, when incident light enters the diffractive optical element from the left side, first order diffracted light (first order light) moves in a lower-right direction, and a zeroth order diffracted light (zeroth order light) moves straight (in a rightward direction).

Figure 13:
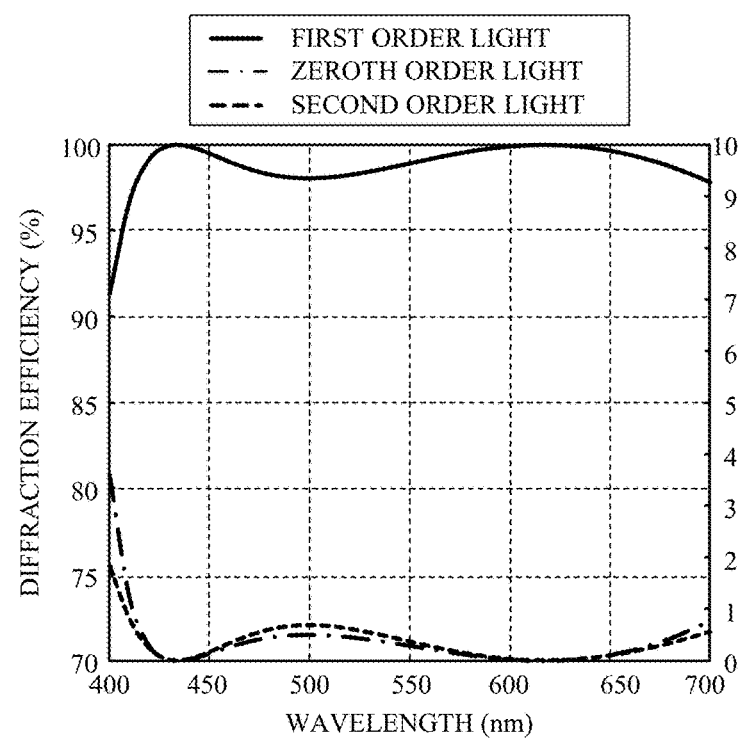
FIG. 13 is an explanatory diagram of wavelength dependence characteristics of a diffraction efficiency of the double-laminated diffractive optical element.

FIG. 13 illustrates wavelength dependence characteristics of diffraction efficiencies of the first order light as diffracted light of a designed order (first order) in the diffractive optical element illustrated in FIG. 10 and the zeroth order light and second order light as diffracted light of the designed order (±1st order). In the diffractive optical element whose diffractive efficiencies have been obtained, a refractive index nd1 and Abbe's number vd1 of a material of the first diffractive grating 6 for d-line are indicated as (nd1,vd1)=(1.636,22.8), and the grating thickness d1 of the first diffractive grating 6 is 7.88 µm. A refractive index nd2 and Abbe's number vd2 of a material of the second diffractive grating 7 for d-line are indicated as (nd2,vd2)=(1.524,51.6). The grating thickness d2 of the second diffractive grating 7 is 10.71 µm. An air distance D1 is 1.5 µm, and a grating pitch P is 200 µm. The incident light enters the glass plate 4 perpendicularly.

As can be seen FIG. 13, the diffracted light (first order light) of the designed order achieves a high diffraction efficiency that is approximately at least 90% over an entire use wavelength band, while diffraction efficiencies of the diffracted light (zeroth order light and second order light) of unnecessary orders are suppressed to be not more than approximately 5% over the entire use wavelength band.

In FIG. 11, a first diffractive grating 6 formed by an ultraviolet curable resin on a glass plate 4 and a second diffractive grating 7 formed by an ultraviolet curable resin, which is the same as that of the first diffractive grating 6, on another glass plate 5 are disposed close to each other via an air layer 8 with a distance D. However, a region between gratings adjacent to each other with respect to the second diffractive grating 7 is buried by an ultraviolet curable resin 9 different from the second diffractive grating 7. The combination of the first and second diffractive gratings 6 and 7 acts as a single diffractive optical element.

The grating thickness of the first diffractive grating 6 is d1, and the grating thickness of the second diffractive grating 7 is d2. With respect to shapes (direction) of the gratings, the first diffractive grating 6 has a shape where the grating thickness monotonically increases from top to bottom in the drawing, and also the second diffractive grating 7 has a shape where the grating thickness monotonically increases from top to bottom. As illustrated in the drawing, when incident light enters the diffractive optical element from the left side, first order diffracted light (first order light) moves in a lower-right direction, and a zeroth order diffracted light (zeroth order light) moves straight (in a rightward direction).

Figure 14:
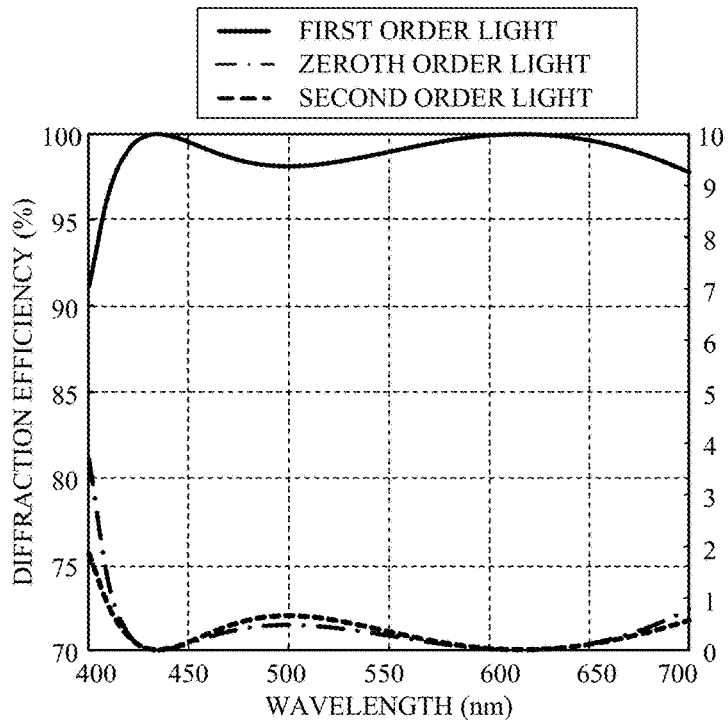
FIG. 14 is an explanatory diagram of wavelength dependence characteristics of a diffraction efficiency of the triple-laminated diffractive optical element.

FIG. 14 illustrates wavelength dependence characteristics of diffraction efficiencies of the first order light as diffracted light of a designed order (first order) in the diffractive optical element illustrated in FIG. 11 and the zeroth order light and second order light as diffracted light of the designed order (±1st order). In the diffractive optical element whose diffractive efficiencies have been obtained, a refractive index nd1 and Abbe's number vd1 of a material of the first diffractive grating 6 for d-line are indicated as (nd1,vd1)=(1.636,22.8), and the grating thickness d1 of the first diffractive grating 6 is 2.83 μm. A refractive index nd2 and Abbe's number vd2 of a material of the second diffractive grating 7 for d-line are indicated as (nd2,vd2)=(1.524,51.6). A refractive index nd9 and the Abbe's number vd9 of the ultraviolet curable resin 9 for d-line are indicated as (nd9,vd9)=(1.636,22.8). The grating thickness d2 of the second diffractive grating 7 is 7.88 μm. An air distance D1 is 1.5 μm, and a grating pitch P is 200 μm. The incident light enters the glass plate 4 perpendicularly.

As can be seen FIG. 14, the diffracted light (first order light) of the designed order achieves a high diffraction efficiency that is approximately at least 90% over an entire use wavelength band, while diffraction efficiencies of the diffracted light (zeroth order light and second order light) of unnecessary orders are suppressed to be not more than approximately 5% over the entire use wavelength band.

In FIG. 12, a first diffractive grating 6 formed by an ultraviolet curable resin on a glass plate 4 and a second diffractive grating 7 formed by an ultraviolet curable resin, different from the first diffractive grating 6, on another glass plate 5 are disposed close to each other via a grating thickness d. The combination of the first and second diffractive gratings 6 and 7 acts as a single diffractive optical element.

With respect to shapes (direction) of the gratings, the first diffractive grating 6 has a shape where the grating thickness monotonically increases from top to bottom in the drawing, and the second diffractive grating 7 has a shape where the grating thickness monotonically decreases from top to bottom. As illustrated in the drawing, when incident light enters the diffractive optical element from the left side, first order diffracted light (first order light) moves in a lower-right direction, and a zeroth order diffracted light (zeroth order light) moves straight (in a rightward direction).

Figure 15:
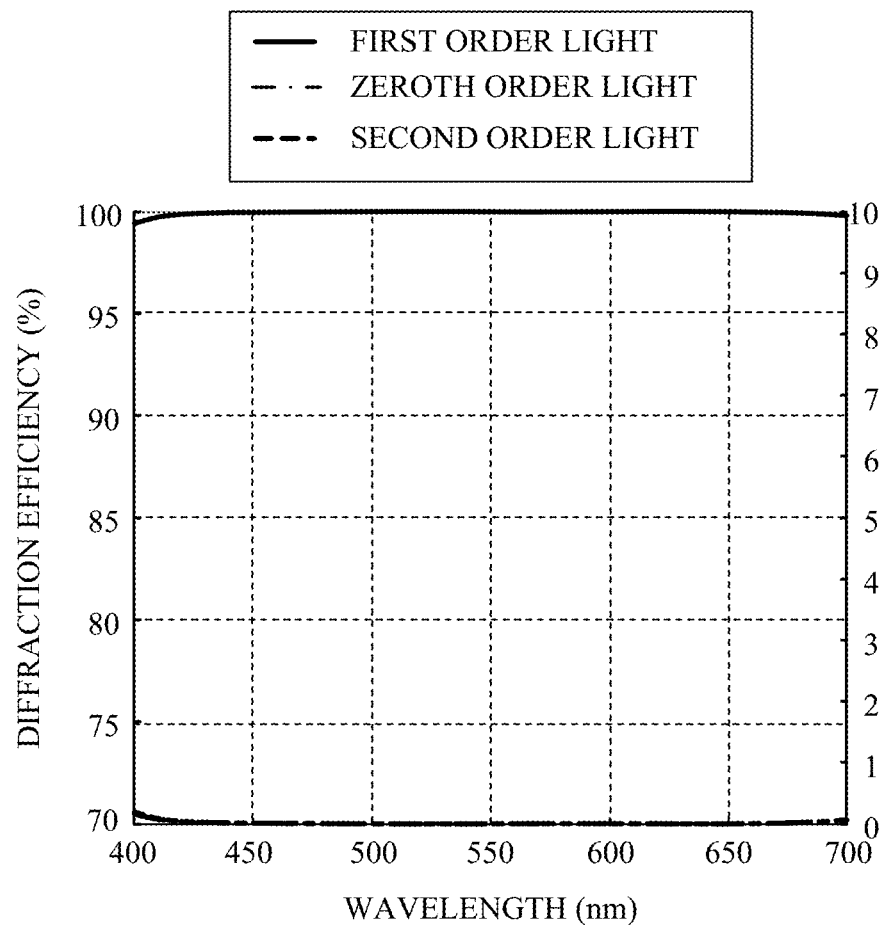
FIG. 15 is an explanatory diagram of wavelength dependence characteristics of a diffraction efficiency of the contact double-layer diffractive optical element.

FIG. 15 illustrates wavelength dependence characteristics of diffraction efficiencies of the first order light as diffracted light of a designed order (first order) in the diffractive optical element illustrated in FIG. 12 and the zeroth order light and second order light as diffracted light of the designed order (±1st order). In the diffractive optical element whose diffractive efficiencies have been obtained, a refractive index nd1 and Abbe's number vd1 of a material of the first diffractive grating 6 for d-line are indicated as (nd1,vd1)=(1.567,46.6). A refractive index nd2 and Abbe's number vd2 of a material of the second diffractive grating 7 for d-line are indicated as (nd2,vd2)=(1.504,16.3). The grating thickness d of each of the first and second diffractive gratings 6 and 7 is 9.29 μm. A grating pitch P is 200 μm. The incident light enters the glass plate 4 perpendicularly.

As can be seen FIG. 15, the diffracted light (first order light) of the designed order achieves an extremely-high diffraction efficiency that is approximately at least 99.5% over an entire use wavelength band, while diffraction efficiencies of the diffracted light (zeroth order light and second order light) of unnecessary orders are sufficiently suppressed to be not more than approximately 0.05% over the entire use wavelength band.

The configurations of the diffractive optical elements illustrated in FIGS. 10 to 12 are examples and diffractive optical elements having other configurations may be used as long as the basic performances such as diffraction efficiencies illustrated in FIGS. 13 to 15 are equal to or higher than that of the diffractive optical elements.

While the diffractive optical element is provided on the optical surface, the optical surface may be a spherical surface, a flat surface, or an aspherical surface. While the diffractive optical element is provided on the interface (joint surface) of the cemented lens in each of Embodiments 1 to 3, it can be provided on another optical surface.

Numerical examples 1 to 3 corresponding to Embodiments 1 to 3, respectively, are indicated below. Each numerical example illustrates a case where the diffractive optical element with the contact double-layer configuration illustrated in FIG. 12 is used.

In each numerical example, symbol ri denotes a radius of curvature of an i-th optical surface from an object side, and symbol di denotes an on-axis spacing of the i-th optical surface in a basic state. Symbols ndi and vdi respectively denote a refractive index and Abbe's number of the i-th optical surface for d-line. Phase shapes of diffractive surfaces (described as "diffraction" at the side of the surface number) and aspherical shapes of aspherical surfaces (symbol "*" is added at the side of the surface number) are respectively represented by the phase function ψ and the aspherical function X described above.

Numerical Example 1

| Unit mm | | | | |
|---------|---|---|---|---|
| Surface data | | | | |
| Surface number | ri | di | ndi | vdi | Effective diameter |
|---|---|---|---|---|---|
| 1 | 97.340 | 18.63 | 1.48749 | 70.2 | 95.19 |
| 2 | −1356.262 | 19.00 | | | 93.27 |
| 3 | 80.187 | 16.79 | 1.49700 | 81.5 | 76.25 |
| 4 | −262.711 | 0.14 | | | 72.85 |
| 5 | −250.137 | 3.62 | 1.77250 | 49.6 | 72.84 |
| 6* | 196.727 | 14.82 | | | 67.74 |
| 7 | 89.188 | 2.76 | 1.78590 | 44.2 | 56.36 |
| 8 | 40.184 | 0.04 | 1.61973 | 43.0 | 51.45 |
| 9 (diffraction) | 40.184 | 0.01 | 1.56691 | 19.4 | 51.49 |
| 10 | 40.184 | 13.34 | 1.48749 | 70.2 | 51.43 |
| 11 | 637.288 | (variable) | | | 49.25 |
| 12 | 276.724 | 3.32 | 1.80809 | 22.8 | 35.20 |
| 13 | −238.067 | 1.80 | 1.88300 | 40.8 | 34.21 |
| 14 | 57.892 | (variable) | | | 32.16 |
| 15 (stop) | ∞ | 2.50 | | | 23.56 |
| 16 | 114.506 | 1.30 | 1.84666 | 23.9 | 23.14 |
| 17 | 33.813 | 4.86 | 1.61340 | 44.3 | 23.10 |
| 18 | −109.359 | 1.80 | | | 23.30 |
| 19 | 83.934 | 3.91 | 1.84666 | 23.9 | 23.76 |
| 20 | −74.484 | 1.30 | 1.81600 | 46.6 | 23.56 |
| 21 | 40.020 | 2.75 | | | 23.16 |
| 22 | −92.935 | 1.30 | 1.88300 | 40.8 | 23.26 |
| 23 | 69.239 | 3.00 | | | 24.16 |
| 24 | 54.683 | 9.43 | 1.62588 | 35.7 | 26.57 |
| 25 | −20.669 | 1.80 | 1.59522 | 67.7 | 27.30 |
| 26 | −190.244 | 3.50 | | | 28.90 |
| 27 | −43.119 | 1.80 | 1.80809 | 22.8 | 29.36 |
| 28 | 48.114 | 7.01 | 1.67300 | 38.1 | 32.92 |
| 29 | −63.886 | 0.50 | | | 34.02 |
| 30 | 126.295 | 5.36 | 1.84666 | 23.9 | 36.70 |
| 31 | −118.569 | 2.50 | | | 37.22 |
| 32 | ∞ | 2.00 | 1.51633 | 64.1 | 37.98 |
| 33 | ∞ | (variable) | | | 38.23 |
| Image plane | ∞ | | | | |

-continued

Unit mm

Aspherical surface data

Sixth surface

K = 2.91567e+000    A1 = 2.35531e−008    A2 = −1.55121e−011
A3 = 6.88361e−015   A4 = −3.45651e−018

Ninth surface

K = 0.00000e+000    A1 = −1.13785e−008   A2 = −7.11264e−010
A3 = 1.67071e−012   A4 = −1.75941e−015

Ninth surface (diffractive surface)

C1 = −5.90314e−005  C2 = −1.45000e−008   C3 = 4.75000e−011
C4 = −1.14000e−013  C5 = 1.03000e−016

Various data

| | |
|---|---|
| Zoom ratio | 1.00 |
| Focal length | 392.20 |
| F number | 4.12 |
| Angle of view | 3.16 |
| Image height | 21.64 |
| Total lens length | 265.01 |
| BF | 66.29 |
| d11 | 18.02 |
| d14 | 29.79 |
| d33 | 66.29 |
| Entrance pupil position | 610.27 |
| Exit pupil position | −61.89 |
| Front-side principal point position | −197.50 |
| Rear-side principal point position | −325.90 |

Zoom lens unit data

| Unit | Start surface | Focal length | Lens configuration length |
|---|---|---|---|
| 1 | 1 | 131.88 | 89.15 |
| 2 | 12 | −79.84 | 5.12 |
| 3 | 15 | 3150.38 | 56.63 |

| Unit | Front-side principal Position | Rear-side principal position |
|---|---|---|
| 1 | 1.88 | −65.55 |
| 2 | 3.45 | 0.63 |
| 3 | 805.90 | 1021.03 |

Single lens data

| Lens | Start surface | Focal length |
|---|---|---|
| 1 | 1 | 187.09 |
| 2 | 3 | 125.65 |
| 3 | 5 | −142.05 |
| 4 | 7 | −95.43 |
| 5 | 8 | 8072.10 |
| 6 | 9 | 8402.27 |
| 7 | 10 | 87.34 |
| 8 | 12 | 158.82 |
| 9 | 13 | −52.59 |
| 10 | 16 | −57.09 |
| 11 | 17 | 42.66 |
| 12 | 19 | 47.14 |
| 13 | 20 | −31.74 |
| 14 | 22 | −44.77 |
| 15 | 24 | 25.18 |
| 16 | 25 | −39.11 |
| 17 | 27 | −27.89 |
| 18 | 28 | 41.83 |
| 19 | 30 | 72.96 |
| 20 | 32 | 0.00 |

Numerical Example 2

Unit mm

Surface data

| Surface number | ri | di | ndi | vdi | Effective diameter |
|---|---|---|---|---|---|
| 1* | 116.065 | 16.50 | 1.48749 | 70.2 | 100.52 |
| 2 | −770.743 | 15.50 | | | 99.42 |
| 3 | 84.876 | 18.00 | 1.43387 | 95.1 | 84.98 |
| 4 | −326.287 | 0.04 | 1.61973 | 43.0 | 82.21 |
| 5 (diffraction) | −326.287 | 0.01 | 1.56691 | 19.4 | 82.18 |
| 6 | −326.287 | 3.30 | 1.65412 | 39.7 | 82.18 |
| 7* | 306.473 | 7.10 | | | 77.59 |
| 8 | 79.064 | 6.86 | 1.43387 | 95.1 | 68.09 |
| 9 | 141.866 | 1.00 | | | 65.63 |
| 10 | 50.329 | 4.50 | 1.85026 | 32.3 | 59.06 |
| 11 | 38.845 | (variable) | | | 52.82 |
| 12 | 312.494 | 4.23 | 1.80809 | 22.8 | 44.40 |
| 13 | −164.502 | 2.00 | 1.88300 | 40.8 | 43.49 |
| 14 | 66.932 | (variable) | | | 40.68 |
| 15 (stop) | ∞ | 2.00 | | | 33.64 |
| 16 | 73.421 | 7.50 | 1.59282 | 68.6 | 32.71 |
| 17 | −52.729 | 1.80 | 1.84666 | 23.8 | 31.67 |
| 18 | −126.526 | 5.00 | | | 31.07 |
| 19 | 338.637 | 3.96 | 1.72825 | 28.5 | 30.33 |
| 20 | −48.427 | 1.55 | 1.61800 | 63.3 | 29.87 |
| 21 | 37.620 | 4.52 | | | 27.03 |
| 22 | −75.156 | 1.55 | 1.77250 | 49.6 | 27.11 |
| 23 | 94.598 | 7.02 | | | 28.46 |
| 24 | 161.760 | 4.33 | 1.65412 | 39.7 | 35.10 |
| 25 | −162.754 | 0.50 | | | 36.14 |
| 26 | 73.180 | 1.90 | 1.80809 | 22.8 | 38.55 |
| 27 | 48.048 | 7.65 | 1.61340 | 44.3 | 38.74 |
| 28 | −112.885 | 7.99 | | | 39.06 |
| 29 | ∞ | 2.00 | 1.51633 | 64.1 | 39.68 |
| 30 | ∞ | (variable) | | | 39.76 |
| Image plane | ∞ | | | | |

Aspherical surface data

First surface

K = 0.00000e+000    A1 = −5.06922e−008   A2 = −4.93038e−013
A3 = −7.36311e−016  A4 = 1.09328e−019

Fifth surface

K = 0.00000e+000    A1 = 3.58609e−007    A2 = −9.02862e−010
A3 = 6.61406e−013   A4 = −1.00775e−016   A5 = −2.84418e−020

Fifth surface (diffractive surface)

C1 = −2.32064e−005  C2 = −2.52096e−008   C3 = 6.45229e−011
C4 = −5.25000e−014  C5 = 1.37816e−017

Seventh surface

K = 0.00000e+000    A1 = −8.01112e−009   A2 = −2.27443e−011
A3 = 2.98818e−014   A4 = −1.91491e−017   A5 = 4.53825e−021

Various data

| | |
|---|---|
| Zoom ratio | 1.00 |
| Focal length | 292.46 |
| F number | 2.91 |
| Angle of view | 4.23 |
| Image height | 21.64 |
| Total lens length | 250.46 |
| BF | 59.08 |
| d11 | 20.93 |
| d14 | 32.15 |
| d30 | 59.08 |
| Entrance pupil position | 425.16 |
| Exit pupil position | −64.08 |
| Front-side principal point position | 23.09 |
| Rear-side principal point position | −233.39 |

-continued

Unit mm

Zoom lens unit data

| Unit | Start surface | Focal length | Lens configuration length |
|---|---|---|---|
| 1 | 1 | 143.44 | 72.81 |
| 2 | 12 | −91.33 | 6.23 |
| 3 | 15 | 225.59 | 59.27 |

| Unit | Front-side principal Position | Rear-side principal position |
|---|---|---|
| 1 | −16.45 | −59.78 |
| 2 | 4.20 | 0.76 |
| 3 | 49.10 | −1.31 |

Single lens data

| Lens | Start surface | Focal length |
|---|---|---|
| 1 | 1 | 208.20 |
| 2 | 3 | 157.33 |
| 3 | 4 | 21503.52 |
| 4 | 5 | 21537.10 |
| 5 | 6 | −241.10 |
| 6 | 8 | 398.48 |
| 7 | 10 | −244.19 |
| 8 | 12 | 133.89 |
| 9 | 13 | −53.66 |
| 10 | 16 | 52.94 |
| 11 | 17 | −107.99 |
| 12 | 19 | 58.43 |
| 13 | 20 | −34.03 |
| 14 | 22 | −54.00 |
| 15 | 24 | 124.68 |
| 16 | 26 | −179.19 |
| 17 | 27 | 55.96 |
| 18 | 29 | 0.00 |

Numerical Example 3

Unit mm

Surface data

| Surface number | ri | di | ndi | vdi | Effective diameter |
|---|---|---|---|---|---|
| 1* | 120.127 | 13.78 | 1.48749 | 70.2 | 95.19 |
| 2 | −578.855 | 4.36 | | | 94.57 |
| 3 | 110.375 | 6.45 | 1.48749 | 70.2 | 87.49 |
| 4 | 66.484 | 0.04 | 1.61973 | 43.0 | 80.93 |
| 5 (diffraction) | 66.484 | 0.01 | 1.61973 | 43.0 | 80.91 |
| 6 | 66.484 | 10.92 | 1.48749 | 70.2 | 80.90 |
| 7 | 150.723 | 10.00 | | | 79.41 |
| 8 | 151.190 | 6.51 | 1.48749 | 70.2 | 73.72 |
| 9 | −4577.299 | 3.28 | 1.65412 | 39.7 | 72.68 |
| 10 | 111.074 | 5.56 | | | 68.17 |
| 11 | 63.690 | 9.74 | 1.43387 | 95.1 | 64.33 |
| 12 | 543.122 | 0.43 | | | 63.08 |
| 13 | 51.217 | 4.99 | 1.74950 | 35.3 | 56.15 |
| 14 | 38.860 | (variable) | | | 50.15 |
| 15 | 254.901 | 1.80 | 1.80000 | 29.8 | 35.18 |
| 16 | 23.047 | 6.71 | 1.80809 | 22.8 | 31.92 |
| 17 | 51.271 | (variable) | | | 30.77 |
| 18 (stop) | ∞ | 0.31 | | | 23.88 |
| 19 | 106.897 | 4.77 | 1.65412 | 39.7 | 23.90 |
| 20 | −30.981 | 1.80 | 1.84666 | 23.8 | 23.44 |
| 21 | −56.334 | 1.23 | | | 23.08 |
| 22 | 2565.199 | 1.80 | 1.88300 | 40.8 | 25.65 |
| 23 | 26.661 | 6.47 | 1.69895 | 30.1 | 25.17 |
| 24 | −53.290 | 0.00 | 1.69895 | 30.1 | 25.19 |
| 25 | −53.290 | 1.80 | 1.88300 | 40.8 | 25.19 |
| 26 | 45.150 | 5.90 | | | 25.47 |
| 27 | 44.178 | 8.03 | 1.58144 | 40.8 | 26.70 |
| 28 | −23.218 | 1.40 | 1.80809 | 22.8 | 26.97 |
| 29 | 610.441 | 5.07 | | | 28.79 |
| 30 | −24.589 | 1.80 | 1.59282 | 68.6 | 28.91 |
| 31 | 179.619 | 10.04 | 1.60342 | 38.0 | 35.59 |
| 32 | −27.206 | 0.15 | | | 37.20 |
| 33 | 158.800 | 3.63 | 1.80809 | 22.8 | 40.84 |
| 34 | −708.251 | 6.20 | | | 41.05 |
| 35 | ∞ | 2.20 | 1.51633 | 64.1 | 41.98 |
| 36 | ∞ | (variable) | | | 42.19 |
| Image plane | ∞ | | | | |

Aspherical surface data

First surface

K = −5.84431e−001   A1 = −4.50324e−008   A2 = −3.00836e−012
A3 = −2.06513e−016   A4 = 1.11977e−019   A5 = −1.48883e−023

Fifth surface

K = 0.00000e+000   A1 = 3.91902e−007   A2 = −9.79150e−010
A3 = 7.29111e−013   A4 = −1.23361e−016   A5 = −2.82239e−020

Fifth surface (diffractive surface)

C1 = −2.63917e−005   C2 = −2.34557e−008   C3 = 5.57655e−011
C4 = −4.70000e−014   C5 = 1.26177e−017

Various data

| Zoom ratio | 1.00 |
|---|---|
| Focal length | 392.15 |
| F number | 4.12 |
| Angle of view | 3.16 |
| Image height | 21.64 |
| Total lens length | 264.97 |
| BF | 61.63 |
| d14 | 30.00 |
| d17 | 26.18 |
| d36 | 61.63 |
| Entrance pupil position | 603.49 |
| Exit pupil position | −74.67 |
| Front-side principal point position | −132.61 |
| Rear-side principal point position | −330.52 |

Zoom lens unit data

| Unit | Start surface | Focal length | Lens configuration length |
|---|---|---|---|
| 1 | 1 | 144.75 | 76.06 |
| 2 | 15 | −83.20 | 8.51 |
| 3 | 18 | 620.15 | 62.59 |

| Unit | Front-side principal Position | Rear-side principal position |
|---|---|---|
| 1 | −16.14 | −62.06 |
| 2 | 6.15 | 1.34 |
| 3 | 181.38 | 181.69 |

Single lens data

| Lens | Start surface | Focal length |
|---|---|---|
| 1 | 1 | 205.40 |
| 2 | 3 | −360.29 |
| 3 | 4 | 18210.45 |
| 4 | 5 | 18780.47 |
| 5 | 6 | 234.07 |
| 6 | 8 | 300.36 |
| 7 | 9 | −165.74 |
| 8 | 11 | 165.28 |
| 9 | 13 | −259.85 |
| 10 | 15 | −31.78 |
| 11 | 16 | 46.83 |
| 12 | 19 | 37.23 |

-continued

| | Unit mm | |
|---|---|---|
| 13 | 20 | −84.04 |
| 14 | 22 | −30.52 |
| 15 | 23 | 26.30 |
| 16 | 24 | 0.00 |
| 17 | 25 | −27.45 |
| 18 | 27 | 27.37 |
| 19 | 28 | −27.65 |
| 20 | 30 | −36.36 |
| 21 | 31 | 39.88 |
| 22 | 33 | 160.82 |
| 23 | 35 | 0.00 |

TABLE 1

| Number of conditional expression | Under limit | Upper limit | Embodiment 1 | Embodiment 2 | Embodiment 3 |
|---|---|---|---|---|---|
| (1) | −0.10 | −0.01 | −0.06 | −0.03 | −0.03 |
| (2) | −1.00E−03 | −1.00E−05 | −9.62E−05 | −2.42E−04 | −4.84E−04 |
| (3) | 0.001 | 0.100 | 0.069 | 0.016 | 0.031 |
| (4) | −5.00E−03 | 1.50E−05 | 9.66E−06 | −1.05E−03 | −1.70E−03 |
| (5) | 2.0 | 40.0 | 8.7 | 3.1 | 29.4 |

In each embodiment described above, each of the phase coefficient of the high order term in the phase function of the diffractive surface and the aspherical coefficient of the high order term in the aspherical function of the aspherical surface is appropriately set. Accordingly, a small imaging optical system that is capable of satisfactorily correcting various aberrations can be achieved while suppressing the occurrence of the flare caused by the refractive power on the diffractive surface. By using this imaging optical system, a small optical apparatus with a satisfactory optical performance can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-244639, filed on Dec. 15, 2015, which is hereby incorporated by reference herein in its entirety.

What is claimed is:
1. An optical system comprising:
a diffractive surface; and
at least one aspherical surface,
wherein a phase function $\psi(r)$ of the diffractive surface is represented by

$$\psi(r) = 2 \times m \times \pi / \lambda 0 \times (C1 \times r^2 + C2 \times r^4 + C3 \times r^6 + C4 \times r^8 + C5 \times r^{10} + \ldots + Cp \times r^{2 \times p}),$$

where $\lambda 0$ is a designed wavelength, m (m is an integer) is a designed diffractive order, r is a position from an optical axis in a height direction orthogonal to the optical axis, i is an integer from 1 to p, Ci is a phase coefficient of a 2i-th order term,
wherein an aspherical function $X(r)$ of the aspherical surface is represented by $$X(r) = (1/R) \times r^2 / [1 + \sqrt{1 - (1+k)(r/R)^2}] + A1 \times r^4 + A2 \times r^6 + A3 \times r^8 + A4 \times r^{10} + \ldots + Aq \times r^{2 \times (q+1)},$$

where R is a paraxial radius of curvature, k is a conic constant, r is the position from the optical axis in the height direction, j is an integer from 1 to q, Aj is an aspherical coefficient of a 2(j+1)-th order term,
wherein when an aspherical surface of the at least one aspherical surface closest to the diffractive surface is referred to as a first aspherical surface, the phase function $\psi(r)$ and the aspherical function $X(r)$ of the first aspherical surface increase with different signs from each other in the height direction with increasing a distance from the optical axis, and a condition below is satisfied:

$$-0.10 \leq \sum_{i=1}^{p} (Ci \times (f/Fno)^{2 \times i-1}) \bigg/ \sum_{j=1}^{q} (Aj \times (f/Fno)^{2 \times j+1}) \leq -0.01$$

where f is a focal length of the optical system when focusing on an infinite object, and Fno is an F number of the optical system,
wherein a value of a sum of phase coefficients Ci of a higher order term than a second order term is large compared to a phase coefficient C1 of the second order term in the phase function $\psi(r)$, and
wherein a focal length fdo on the diffractive surface is set to a value satisfying $$1/fdo = -2 \times m \times C1 \times \lambda/\lambda 0,$$

where $\lambda$ is a wavelength, and
wherein conditions below are satisfied:

$$-1.0 \times 10^{-3} \leq C1 \bigg/ \sum_{i=2}^{p} (Ci \times (f/Fno)^{2 \times i}) \leq -1.0 \times 10^{-5}$$

$$0.001 \leq (f/fdo)/(L/f) \leq 0.100$$

where L is a total optical length of the optical system.

2. The optical system according to claim 1,
wherein an optical surface provided with the first aspherical surface is identical to an optical surface provided with the diffractive surface,
wherein a value of a sum of aspherical coefficients Aj of higher order terms than a fourth order term is large compared to an aspherical coefficient A1 of the fourth order term in the aspherical function $X(r)$ of the first aspherical surface, and wherein a condition below is satisfied:

$$-5.0 \times 10^{-3} \leq A1 \bigg/ \sum_{j=2}^{q} (Aj \times (f/Fno)^{2 \times j}) \leq 1.5 \times 10^{-5}.$$

3. The optical system according to claim 1,
wherein a spherical aberration at an imaging position of an (m+1)-th order diffracted light occurs at the imaging position side of an m-th order diffracted light at a periphery of a pupil of the optical system, and
wherein a condition below is satisfied:

$$2 < SAh9_{(m+1)}/SAh5_{(m+1)} < 40,$$

where $SAh9_{(m+1)}$ is a spherical aberration amount in a state of focusing on the infinite object at a 90% of a pupil position of a d-line of the (m+1)-th order diffracted light, and $SAh5_{(m+1)}$ is a spherical aberration amount in a state of focusing on the infinite object at a 50% of the pupil position of the d-line of the (m+1)-th diffracted light.

4. The optical system according to claim 1, further comprising in order from an object side to an image side,
a first lens unit having a positive refractive power;
a second lens unit configured to move in an optical axis direction of the optical system with a change of focus from an infinite object side to a close-range object side;
an aperture stop; and
a third lens unit,
wherein the diffractive surface and the first aspherical surface are provided in the first lens unit.

5. The optical system according to claim 1, wherein the at least one aspherical surface is provided near the diffractive surface.

6. An optical apparatus comprising:
the optical system according to claim 1; and
a housing holding the optical system.

7. An optical system comprising:
a diffractive surface; and
at least one aspherical surface,
wherein a phase function $\psi(r)$ of the diffractive surface is represented by $$\psi(r) = 2 \times m \times \pi/\lambda 0 \times (C1 \times r^2 + C2 \times r^4 + C3 \times r^6 + C4 \times r^8 + C5 \times r^{10} + \ldots + Cp \times r^{2 \times p}),$$

where $\lambda 0$ is a designed wavelength, m (m is an integer) is a designed diffractive order, r is a position from an optical axis in a height direction orthogonal to the optical axis, i is an integer from 1 to p, Ci is a phase coefficient of a 2i-th order term,
wherein an aspherical function X(r) of the aspherical surface is represented by $$X(r) = (1/R) \times r^2/[1 + \sqrt{\{1-(1+k)(r/R)^2\}}] + A1 \times r^4 + A2 \times r^6 + A3 \times r^8 + A4 \times r^{10} + \ldots + Aq \times r^{2 \times (q+1)},$$

where R is a paraxial radius of curvature, k is a conic constant, r is the position from the optical axis in the height direction, j is an integer from 1 to q, Aj is an aspherical coefficient of a 2(j+1)-th order term,
wherein when an aspherical surface of the at least one aspherical surface closest to the diffractive surface is referred to as a first aspherical surface, the phase function $\psi(r)$ and the aspherical function X(r) of the first aspherical surface increase with different signs from each other in the height direction with increasing a distance from the optical axis, and a condition below is satisfied:

$$-0.10 \leq \sum_{i=1}^{p}(Ci \times (f/Fno)^{2 \times i-1}) \bigg/ \sum_{j=1}^{q}(Aj \times (f/Fno)^{2 \times j+1}) \leq -0.01$$

where f is a focal length of the optical system when focusing on an infinite object, and Fno is an F number of the optical system,
wherein an optical surface provided with the first aspherical surface is identical to an optical surface provided with the diffractive surface,
wherein a value of a sum of aspherical coefficients Aj of higher order terms than a fourth order term is large compared to an aspherical coefficient A1 of the fourth order term in the aspherical function X(r) of the first aspherical surface, and
wherein a condition below is satisfied:

$$-5.0 \times 10^{-3} \leq A1 \bigg/ \sum_{j=2}^{q} (Aj \times (f/Fno)^{2 \times j}) \leq 1.5 \times 10^{-5}.$$

8. An optical apparatus comprising:
the optical system according to claim 7; and
a housing holding the optical system.

* * * * *